(12) United States Patent
Yamashita

(10) Patent No.: US 7,355,292 B2
(45) Date of Patent: Apr. 8, 2008

(54) POWER GENERATION CONTROL APPARATUS FOR INTERNAL COMBUSTION ENGINE

(75) Inventor: Yukihiro Yamashita, Takahama (JP)

(73) Assignee: Denso Corporation, Kariya, Aichi-pref (JP)

(*) Notice: Subject to any disclaimer, the term of this patent is extended or adjusted under 35 U.S.C. 154(b) by 76 days.

(21) Appl. No.: 11/443,374

(22) Filed: May 31, 2006

(65) Prior Publication Data

US 2006/0276937 A1    Dec. 7, 2006

(30) Foreign Application Priority Data

| Jun. 2, 2005 | (JP) | ............................. 2005-162650 |
| Jun. 2, 2005 | (JP) | ............................. 2005-162651 |
| Jul. 26, 2005 | (JP) | ............................. 2005-215730 |
| Jul. 26, 2005 | (JP) | ............................. 2005-215731 |
| Jul. 26, 2005 | (JP) | ............................. 2005-215732 |
| Aug. 8, 2005 | (JP) | ............................. 2005-229036 |

(51) Int. Cl.
*F02B 3/00* (2006.01)

(52) U.S. Cl. .................... 290/40 C; 290/41; 123/417

(58) Field of Classification Search ............ 290/40 R, 290/41, 40 A, 40 B, 40 C; 123/417, 416, 123/440
See application file for complete search history.

(56) References Cited

U.S. PATENT DOCUMENTS

| 4,255,789 A | * | 3/1981 | Hartford et al. ............. 701/108 |
| 4,445,483 A | * | 5/1984 | Hasegawa ..................... 123/492 |
| 4,606,315 A | * | 8/1986 | Tobinaga et al. ............ 123/335 |
| 4,713,766 A | * | 12/1987 | Kobayashi et al. .......... 701/103 |
| 4,719,888 A | * | 1/1988 | Kobayashi et al. .......... 123/683 |
| 4,729,219 A | * | 3/1988 | Kayanuma et al. ............ 60/274 |
| 4,895,120 A | * | 1/1990 | Tobinaga et al. ............ 123/335 |
| 5,336,932 A | | 8/1994 | Barske |
| 5,461,289 A | * | 10/1995 | Adler et al. ................. 318/139 |
| 5,789,882 A | * | 8/1998 | Ibaraki et al. ............... 318/148 |
| 5,841,201 A | * | 11/1998 | Tabata et al. .............. 290/40 C |
| 6,621,250 B1 | | 9/2003 | Ohkubo et al. |
| 7,104,043 B2 | * | 9/2006 | Zhu et al. ...................... 60/284 |
| 7,105,938 B2 | * | 9/2006 | Edelson .................... 290/40 A |
| 7,137,382 B2 | * | 11/2006 | Zhu et al. .................... 123/435 |

FOREIGN PATENT DOCUMENTS

| JP | 2000-4502 | 1/2001 |
| JP | 2005-12971 | 1/2005 |

* cited by examiner

*Primary Examiner*—Nicholas Ponomarenko
(74) *Attorney, Agent, or Firm*—Nixon & Vanderhye P.C.

(57) ABSTRACT

An increment of a fuel consumption rate caused by power generation is determined from a difference in fuel consumption rate between a case of performing power generation of an alternator and a case of stopping the power generation. The increment of the fuel consumption rate is divided by a power generation amount of the alternator to determine an increment of a fuel consumption per unit power generation amount. A use-frequency of the electric consumption is determined and also a possible power generation amount and average consumption power are calculated. A target electric consumption is set based upon the use-frequency, the possible power generation amount and the average consumption power so that the charge and discharge balance of the battery becomes zero. The present electric consumption is compared with the target electric consumption to determine whether or not to perform the power generation of the alternator.

48 Claims, 24 Drawing Sheets

FIG. 15

| SOC (%) | 85 | 87.5 | 90 | 92.5 | 95 |
|---|---|---|---|---|---|
| NFClmt (sec) | 100 | 400 | 500 | 400 | 100 |

FIG. 16

| BATTERY CAPACITY (Ah) | 24 | 32 | 48 | 56 |
|---|---|---|---|---|
| NFClmt (sec) | 250 | 425 | 500 | 580 |

FIG. 17

| AVERAGE CONSUMPTION POWER (W) | 100 | 250 | 400 | 500 |
|---|---|---|---|---|
| NFClmt (sec) | 1250 | 500 | 312.5 | 250 |

FIG. 18

| SOC (%) | 85 | 87.5 | 90 | 92.5 | 95 |
|---|---|---|---|---|---|
| Kcmp | 5 | 1.2 | 1 | 1.2 | 5 |

| BATTERY CAPACITY (Ah) | 24 | 32 | 48 | 56 |
|---|---|---|---|---|
| Kcmp | 2 | 1.5 | 1 | 0.857 |

| AVERAGE CONSUMPTION POWER (W) | 100 | 250 | 400 | 500 |
|---|---|---|---|---|
| Kcmp | 0.4 | 1 | 1.6 | 2 |

FIG. 29
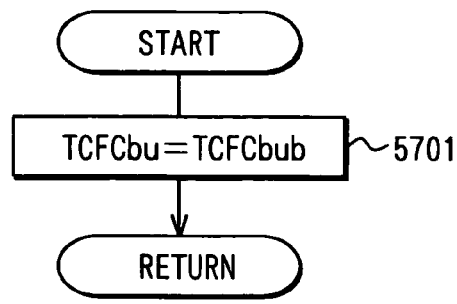
FIG. 30
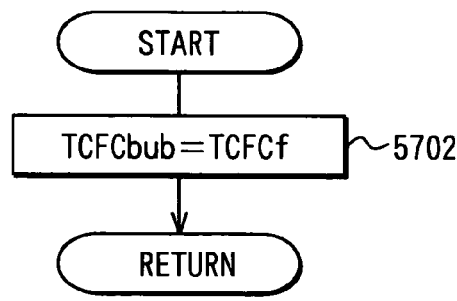
FIG. 31
| SAMPLE PERIOD (sec) | 0 | 200 | 400 | 600 | 800 |
|---|---|---|---|---|---|
| $\alpha s$ | 0 | 0.25 | 0.5 | 0.75 | 1 |
FIG. 32
| Tgdev (g/s1W) | -0.03 | -0.02 | 400 | 0 | 0.01 | 0.02 | 0.03 |
|---|---|---|---|---|---|---|---|
| $\alpha t$ | 1 | 0.8 | 0.4 | 0 | 0.4 | 0.8 | 1 |

| CPavef (W) | 200 | 300 | 400 |
|---|---|---|---|
| αe | 0 | 0.5 | 1 |

| SOC (%) | 80 | 85 | 90 | 95 | 100 |
|---|---|---|---|---|---|
| αb | 1 | 0.8 | 0 | 0.8 | 1 |

| AVERAGE CONSUMPTION POWER (W) | 200 | 300 | 400 | 500 |
|---|---|---|---|---|
| Ne | 800 | 600 | 200 | 200 |

| SOC (%) | 80 | 85 | 90 | 95 | 100 |
|---|---|---|---|---|---|
| Nb | 1 | 0.8 | 0 | 0.8 | 1 |

POWER GENERATION CONTROL APPARATUS FOR INTERNAL COMBUSTION ENGINE

CROSS-REFERENCE TO RELATED APPLICATION

This application is based on Japanese Patent Applications No. 2005-162650 filed on Jun. 2, 2005, No. 2005-162651 filed on Jun. 2, 2005, No. 2005-215730 filed on Jul. 26, 2005, No. 2005-215731 filed on Jul. 26, 2005, No. 2005-215732 filed on Jul. 26, 2005, No. 2005-229036 filed on Aug. 8, 2005, the disclosures of which are incorporated herein by reference.

FIELD of THE INVENTION

The present invention relates to a power generation control apparatus which controls an alternator in consideration of an increment of fuel consumption caused by power generation of the alternator.

BACKGROUND OF THE INVENTION

An alternator mounted on a vehicle is, in many cases, controlled in such a manner that a control current (field current) of the alternator is controlled to control a power generation amount for preventing the battery from being in lack of charge due to checking a charging state of the battery. (refer to JP-2000-4502A and JP-2001-78365A).

This alternator is driven by power of an internal combustion engine and therefore, at the time of power generation, additional fuel is to be consumed in accordance with a load required for driving the alternator. Therefore, some of the alternators generate power only in a region where fuel consumption at the time of the power generation is reduced (refer to JP-6-505619T and JP-2005-12971A).

Although the technology described in JP-6-505619T or JP-2005-12971A each is to reduce an increment of the fuel consumption due to the power generation, an operating condition in which the power generation is carried out is determined by a map in advance set. Accordingly, the fuel saving effect easily depends on accuracy of the map, use environments of a vehicle (a difference in travel road state, a difference in vehicle speed and a difference in acceleration/deceleration by a driver, or the like) or variations in vehicle characteristic. Therefore, the above technology does not necessarily obtain a sufficient fuel saving effect.

In view of the above, there exists a need for a power generation control apparatus for an internal combustion engine which overcomes the above mentioned problems in the conventional art. The present invention addresses this need in the conventional art as well as other needs, which will become apparent to those skilled in the art from this disclosure.

SUMMARY OF THE INVENTION

The present invention is made in view of the above matters, and it is an object of the present invention to provide a power generation control apparatus for an internal combustion engine which can safely reduce an increment of fuel consumption due to power generation while securing a required power generation amount.

In order to achieve the above object, a power generation control apparatus for an internal combustion engine according to an aspect of the present invention comprises a alternator driven by power of the internal combustion engine, a battery which is charged with power generated by the alternator, and a power generation controller for controlling power generation of the alternator, the power generation control apparatus further comprising fuel consumption calculating means which calculates an increment of fuel consumption per unit power generation amount based upon an increment of the fuel consumption and a power generation amount caused by the power generation of the alternator, wherein the power generation controller controls the increment of the fuel consumption per unit power generation amount to a target increment of the fuel consumption. When the increment of the fuel consumption per unit power generation amount is thus controlled to the target increment of the fuel consumption, the fuel saving effect is less influenced by accuracy of the map, use environments of a vehicle (a difference in travel road state, a difference in vehicle speed and a difference in acceleration/deceleration by a driver or the like) or variations in vehicle characteristic, as compared to the conventional power generation control apparatus in which an operating condition for carrying out the power generation is determined by a map in advance set. Therefore, the increment of the fuel consumption caused by the power generation is certainly reduced while securing the required power generation amount

BRIEF DESCRIPTION OF THE DRAWINGS

Other objects, features, and advantages of the present invention will become more apparent from the following detailed description made with reference to the accompanying drawings, in which like parts are designated by like reference numbers and in which:

FIG. 15 is a table showing one example of a map for determining a sample number of one sample period in accordance with a battery remaining charging amount in a fifth embodiment of the present invention;

FIG. 16 is a table showing one example of a map for determining a sample number of one sample period in accordance with a battery capacity in the fifth embodiment;

FIG. 17 is a table showing one example of a map for determining a sample number of one sample period in accordance with average consumption power in the fifth embodiment;

FIG. 18 is a table showing one example of a map for determining a correction coefficient to a F/B gain in accordance with a battery remaining charging amount in the fifth embodiment;

FIG. 29 is a flow chart showing a flow of the process in the initial process routine in the eighth embodiment;

FIG. 30 is a flow chart showing a flow of the process in the backup routine for final target electric consumption in the eighth embodiment;

FIG. 31 is a table showing one example of a map for calculating a weighting factor in accordance with a sample period during this time's traveling in the eighth embodiment;

FIG. 32 is a table showing one example of a map for calculating a weighting factor in accordance with a deviation between a target electric consumption calculated during this time's traveling and a final target electric consumption during the previous traveling stored in a nonvolatile memory in the eighth embodiment;

DETAILED DESCRIPTION OF THE PREFERRED EMBODIMENTS

The following description of preferred embodiments of the present invention is merely exemplary in nature and is in no way intended to limit the present invention, its application, or uses.

First Embodiment

Figure 1:
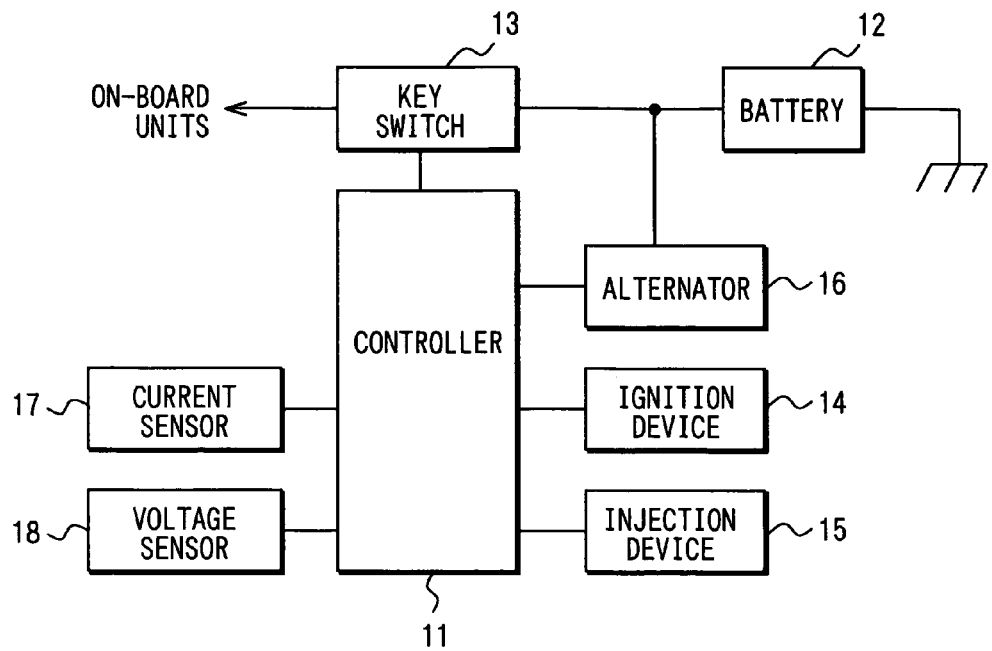
FIG. 1 is a block diagram showing a system structure in a first embodiment of the present invention.

Referring to FIG. 1, a control device 11 serves as power generation means to which a power source is supplied through a battery 12 and a key switch 13 to control operations of an ignition device 14 and an injection device 15 during engine operating and also to control power generation of an alternator 16. Control of the power generation in the first embodiment will be hereinafter described.

The control device 11 calculated a charge rate SOC of the battery 12 based upon a charging/discharging current of the battery 12 detected by a current sensor 17 (current detector) and/or an open terminal voltage of the battery 12 detected by a voltage sensor 18 (voltage detector). For example, the control device 11 detects the charging/discharging current of the battery 12 with the current sensor 17 (current detector) and integrates the detection values. On this occasion, a charging current of the battery 12 is set as a plus value and a discharging current of the battery 12 is set as a minus value and thereby an integration value of the charging and discharging current is increased/decreased depending on the charge rate SOC of the battery 12. Accordingly, it is possible to use the integration value of the charging and discharging current as detection data of the charge rate SOC of the battery 12. Alternatively, by referring to a map showing a relation between then open terminal voltage and the charge rate SOC of the battery 12, the charge rate SOC in accordance with the existing open terminal voltage of the battery 12 may be calculated. Further, the charge rate SOC of the battery 12 may be calculated based upon both of the integration value of the charging and discharging current and the open terminal voltage of the battery 12.

Figure 2:
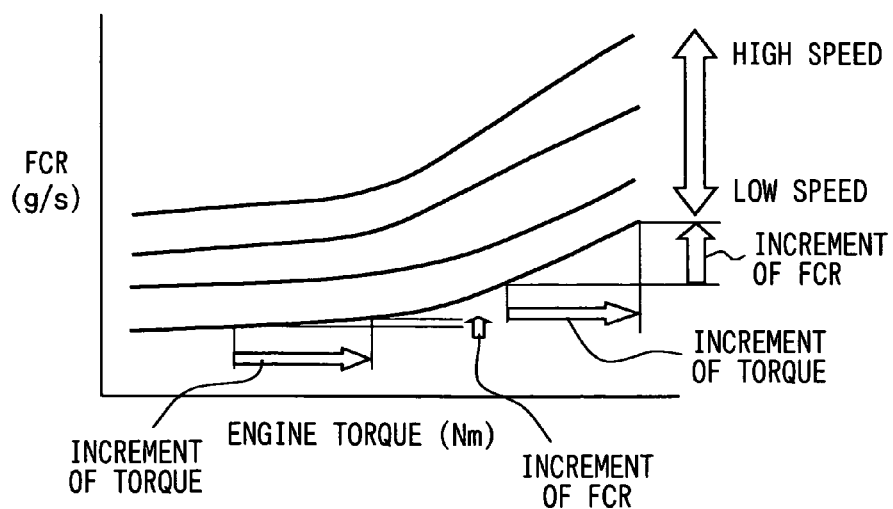
FIG. 2 is a graph showing a relation between a fuel consumption rate and an engine operating condition in the first embodiment.

FIG. 2 is a table showing a relation between a fuel consumption rate FCR as fuel consumption per unit time and an engine operating condition. As shown in FIG. 2, the fuel consumption rate FCR changes with an engine rotational speed and engine torque. Since the fuel consumption rate FCR changes in a curve with the engine torque, when the engine rotational speed is constant, there are provided two conditions as to an increment of the engine torque, one causing an increment of the fuel consumption rate FCR to become large or the other causing the increment of the fuel consumption rate FCR to become small. For example, when the alternator 16 generates a certain amount of power, the torque caused by the alternator 16 is added to the engine torque by power generation to change an operational point of the engine. Therefore, the fuel consumption rate FCR changes with a power generation amount. When, at this point, the power generation is carried out by selecting only the condition on which the fuel consumption rate FCR is small, it is possible to reduce the fuel consumption rate FCR.

Accordingly, an increment of a fuel consumption rate per unit power generation amount (hereinafter, referred to as electric consumption) is used as a parameter of power generation control. The electric consumption is calculated as follows. First, an increment of a fuel consumption rate caused by power generation is determined from a difference between a fuel consumption rate (fuel consumption rate at the time of power generation) in a case of performing power generation of the alternator 16 and a fuel consumption rate (a fuel consumption rate at the time of no power generation) in a case of stopping power generation of the alternator 16. The increment of the fuel consumption rate by this power generation is divided by the power generation amount of the alternator 16 to determine the electric consumption (an increment of the fuel consumption rate per unit power generation amount).

Electric consumption (g/kWs)=(fuel consumption rate at the time of power generation−fuel consumption rate at the time of no power generation)/power generation amount.

Further, in the first embodiment, use-frequency of the electric consumption for each class is determined in a predetermined calculation cycle (for example, 8 ms cycle) during engine operating, and also a possible power generation amount and an average consumption power for each class are calculated. Based upon the use-frequency of the electric consumption, the possible power generation amount and the average consumption power for each class, target electric consumption is set so that the charge/discharge balance becomes zero (the charging amount and discharging amount are balanced). Based upon this, it is determined whether or not to execute power generation of the alternator 16 by comparing the current electric consumption with the target electric consumption. Herein, "class" means a predetermined range obtained by dividing the range of the minimum value (0) to the maximum value of the electric consumption by a predetermined number.

The power generation of the first embodiment as described above is executed through each routine in FIGS. 3 to 7 by the control device 11. The process content of each routine will be hereinafter explained.

[Calculating Routine for Electric Consumption]

Figure 3:
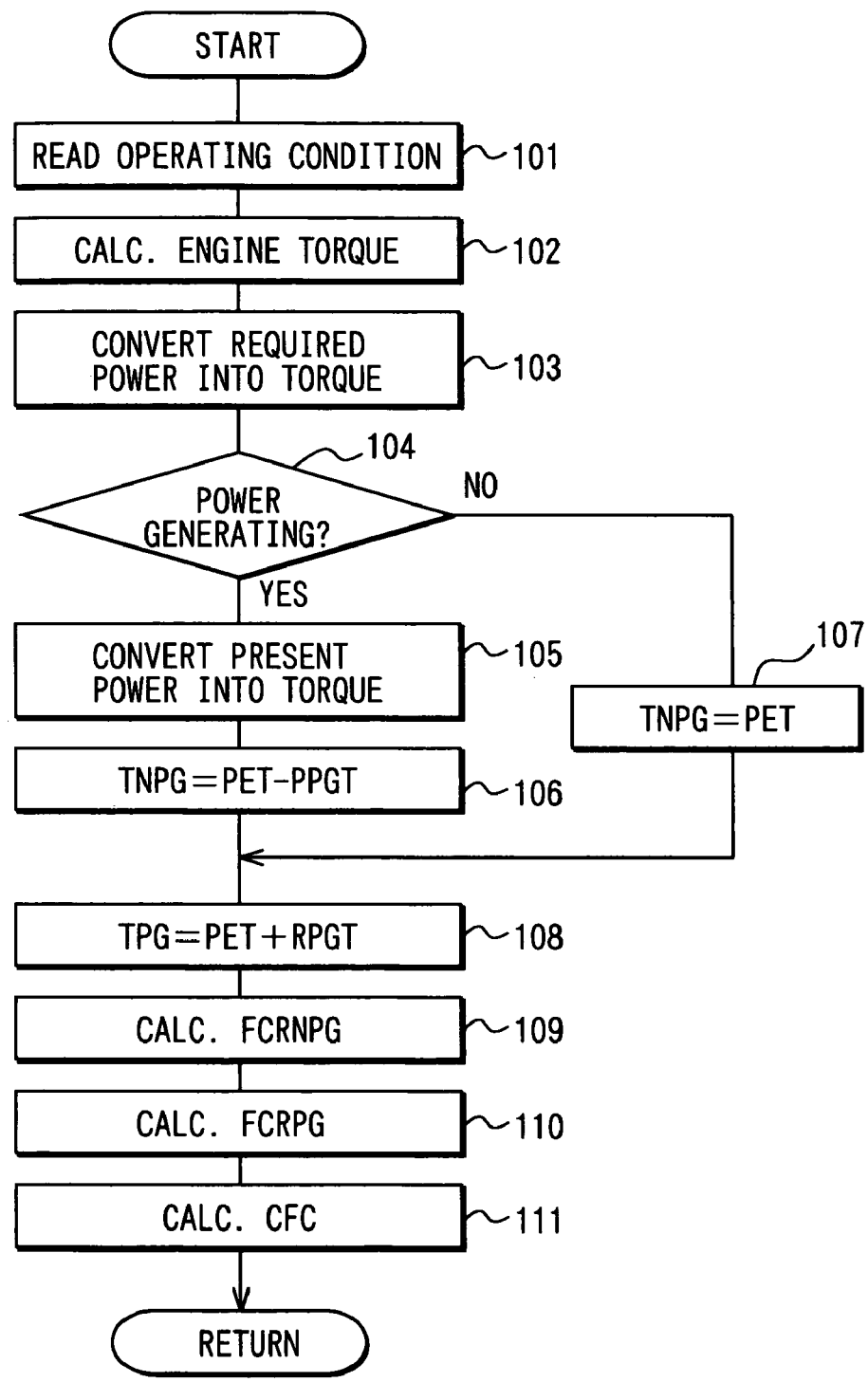
FIG. 3 is a flow chart showing a flow of the process in the calculating routine for electric consumption in the first embodiment.

The calculating routine for electric consumption in FIG. 3 is executed in a predetermined cycle (for example, 8 ms cycle) during engine operating. When the routine is activated, first at Step 101, the present operating condition (for example, an engine rotational speed, an intake air quantity, a required power generation amount and the like) is read in. The required power generation amount is in advance set based upon the maximum possible power generation amount of the alternator 16, the power generation efficiency of the alternator 16 and the like.

Thereafter, the process goes to Step 102, wherein the present engine torque is calculated from the present operating condition and then, the process goes to Step 103, wherein the required power generation amount is converted into torque (that is, the torque required for performing the power generation which is equivalent to the required power generation amount is calculated). This torque is stored in the RAM of the control device 11 as the required power generation amount torque.

In addition, at next Step 104, a determination is made as to whether or not the alternator 16 is under power generating. When it is determined that the alternator 16 is under power generating, the process goes to Step 105, wherein the present power generation amount is converted into torque. This torque is stored in the RAM of the control device 11 as the present power generation amount torque. At Step 106, torque at the time of non-power generation (TNPG) is to be determined by reducing the present power generation amount torque (PPGT) calculated at Step 105 from the present engine torque (PET) calculated at Step 102. This torque at the time of the non-power generation corresponds to engine torque in a case where the power generation of the alternator 16 is stopped. On the other hand, when it is determined that the alternator 16 is not under power generating, the process goes to Step 107, wherein the present engine torque is set as the torque at the time of the non power generation as it is.

As described above, the torque at the time of the non power generation is calculated and thereafter, the process goes to Step 108, wherein torque at the time of power generation (TPG) is determined by adding the required power generation amount torque (RPGT) calculated at Step 103 to the present engine torque calculated at Step 102. The torque at the time of the power generation corresponds to engine torque in a case of performing power generation of the alternator 16.

Thereafter, the process goes to Step 109, wherein a fuel consumption rate (g/s) at the time of the non power generation (FCRNPG) in accordance with the present engine rotational speed and the torque at the time of non power generation is calculated by a calculating map for the fuel consumption rate, similar to that in FIG. 2. The fuel consumption rate at the time of the non-power generation corresponds to a fuel consumption rate in a case of stopping power generation of the alternator 16. The calculating map for the fuel consumption rate is set by in advance measuring a fuel consumption rate in a steady engine operating condition.

Thereafter, the process goes to Step 110, wherein a fuel consumption rate (g/s) at the time of the power generation (FCRPG) in accordance with the present engine rotational speed and the torque at the time of power generation is calculated by a calculating map for the fuel consumption rate, similar to that in FIG. 2. The fuel consumption rate at the time of the power generation corresponds to a fuel consumption rate in a case of performing power generation of the alternator 16.

Thereafter, the process goes to Step 111, wherein a difference between the fuel consumption rate (g/s) at the time of the power generation and the fuel consumption rate (g/s) at the time of the non power generation is divided by the present power generation amount (kW) to determine electric consumption CFC (g/kWs) as a fuel consumption rate per unit power generation amount.

CFC(g/kWs)=(a fuel consumption rate at the time of the power generation−a fuel consumption rate at the time of the non power generation)/power generation amount.

[Accumulating Routine for Electric Consumption Class Data]

Figure 4:
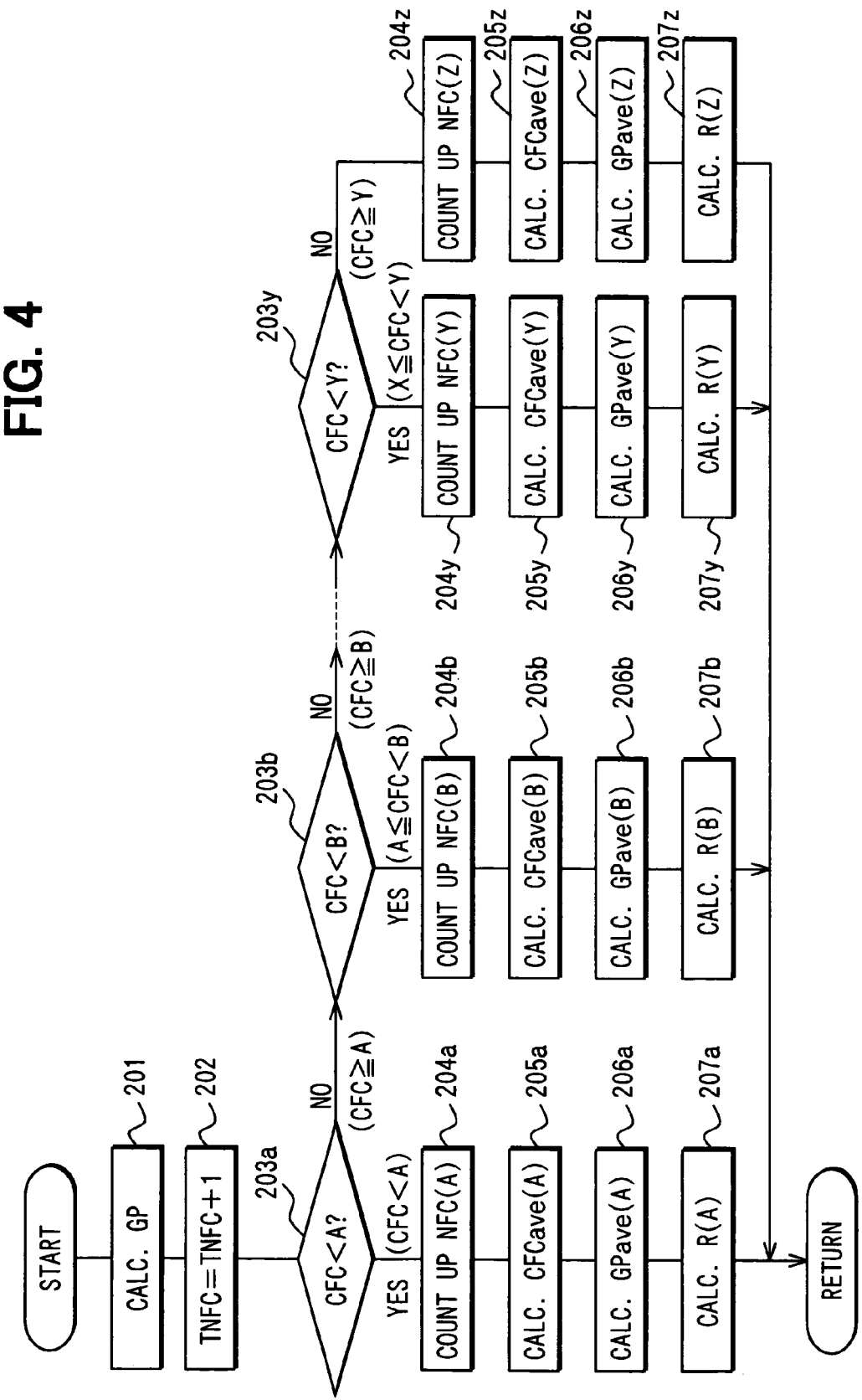
FIG. 4 is a flow chart showing a flow of the process in the accumulating routine for electric consumption class data in the first embodiment.

An accumulating routine of electric consumption class data in FIG. 4 is executed in a predetermined cycle (for example, 8 ms cycle) during engine operating. Thereby, use-frequency of the electric consumption CFC, an average value of the electric consumption and an average value of the possible power generation amount for each class in the past travel history are calculated as follows and theses data are accumulated in the RAM of the control device 11.

When this routine is activated, first at Step 201, a possible power generation amount GP in accordance with the present engine rotational speed is calculated from the map showing the relation between engine rotational speeds and power generation characteristics of the alternator 16. Then the process goes to Step 202, wherein a count value of the present total sample number NFC total counts up. Then the process goes to Step 203a, wherein it is determined whether or not this time's electric consumption CFC is included in class A (whether or not the electric consumption CFC<A). When this time's electric consumption CFC is included in class A, data of class A are updated as follows.

First, at Step 204a, a count value of the sample number NFC (A) counts up. Then the process goes to Step 205a, wherein an electric consumption average value CFCave (A) of class A is calculated by the following equation from the previous electric consumption average value old CFCave (A), the sample number NFC (A) and this time's electric consumption CFC of class A.

CFCave($A$)=[oldCFCave($A$)×{NFC($A$)−1}+CFC]/NFC($A$).

Thereafter, the process goes to Step 206a, wherein an average value GPave (A) of a possible power generation amount of the class A is calculated by the following equation from the previous possible power generation amount old GPave (A), the sample number NFC (A) and this time's possible power generation amount GP of the class A.

GPave($A$)=[oldGPave($A$)×{NFC($A$)−1}+GP]/NFC($A$).

Thereafter, the process goes to Step 207a, wherein the use-frequency of the class A is determined by dividing the sample number NFC (A) of the class A by the total sample number NFC total of all classes A to Z.

$R(A)$=NFC($A$)/NFC total.

On the other hand, when it is determined at Step 203b that this time's electric consumption CFC is not included in the class A, the process goes to Step 203y, wherein it is determined whether or not this time's electric consumption CFC is included in class B greater next to the class A (whether or not A≦electric consumption CFC<B). When this time's electric consumption CFC is included in the class B, processes of Step 204b to Step 207b are executed to calculate a sample number NFC (B), an electric consumption average value CFCave (B), an average value of a possible power generation amount GPave (B) and use-frequency R (B) of the class B by the method similar to the above method, with which the corresponding memory data are updated.

Hereinafter, during vehicle traveling, electric consumption average values CFCave (C) to CFCave (Z), average values of possible power generation amounts GPave (C) to GPave (Z) and use frequencies R (C) to R (Z) of the class C to class Z respectively are calculated, with which the corresponding data are updated.

[Calculating Routine for Average Consumption Power]

Figure 5:
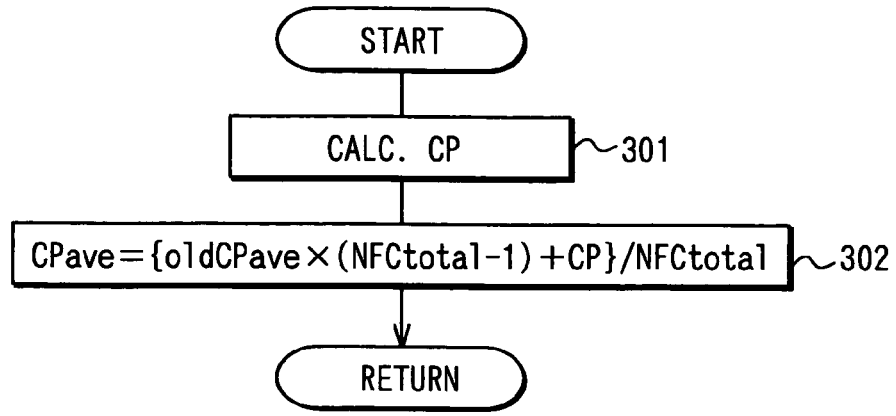
FIG. 5 is a flow chart showing a flow of the process in the calculating routine for average consumption power in the first embodiment.

A calculating routine of average consumption power in FIG. 5 is executed in a predetermined cycle (for example, 8 ms cycle) during engine operating. When this routine is activated, first at Step 301 consumption power CP per calculation cycle consumed in a vehicle is calculated. Thereafter, the process goes to Step 302, wherein an average consumption power CPave is calculated according to the following equation from the previous average consumption power old CPave, the total sample number NFC total and this time's consumption power CP.

CPave={old CPave×(NFC total−1)+CP}/NFC total.

[Calculating Routine for Target Electric Consumption]

Figure 6:
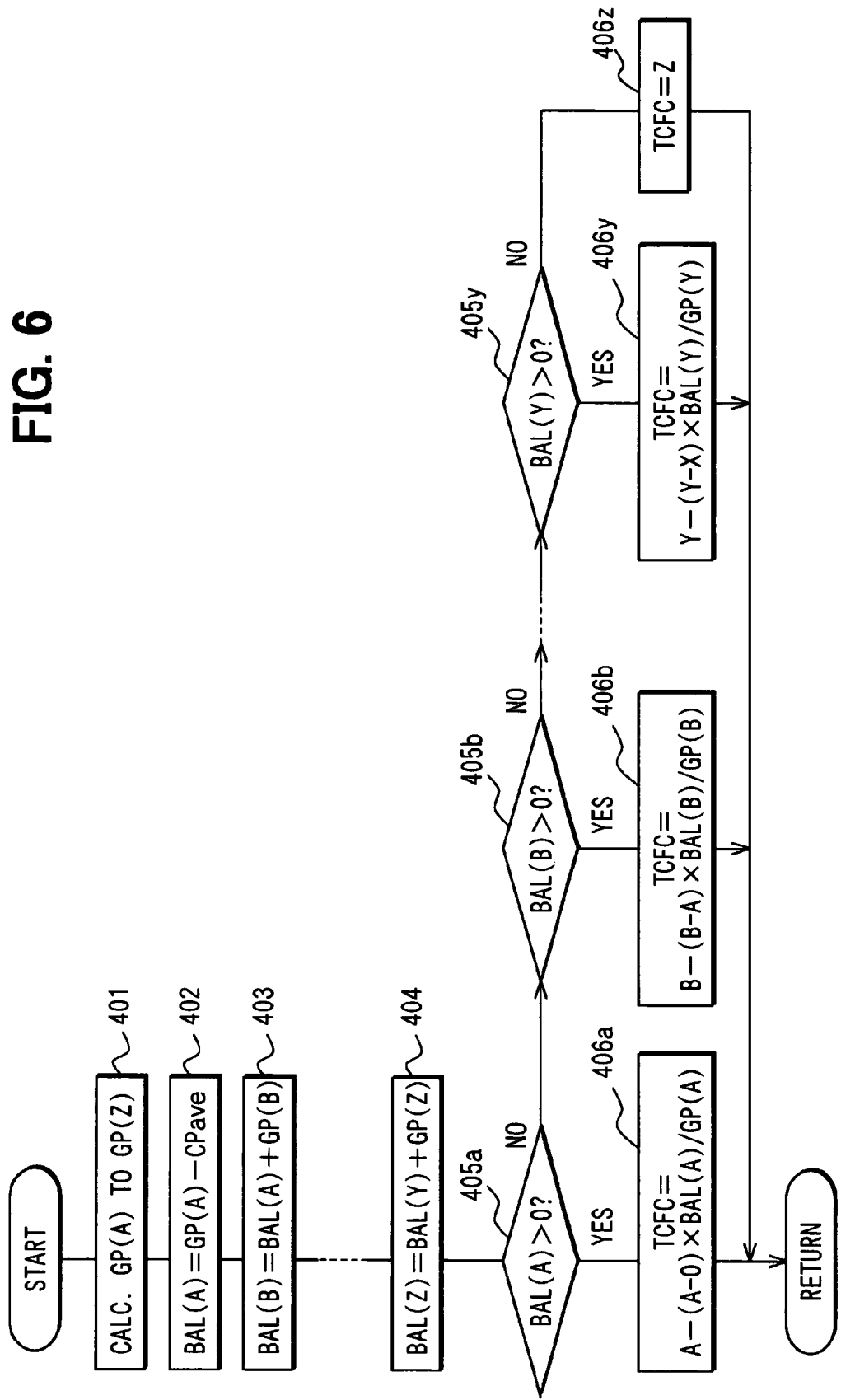
FIG. 6 is a flow chart showing a flow of the process in the calculating routine for target electric consumption in the first embodiment.

A calculating routine of target electric consumption in FIG. 6 is executed in a predetermined cycle (for example, 8 ms cycle) during engine operating and a target electric consumption TCFC is calculated as follows. When this routine is activated, first at Step 401 possible electric consumption amounts GP (A) to GP (Z) of CP of respective classes A to Z are determined by multiplying average values of possible power generation amounts GPave (A) to GPave (Z) of the respective classes A to Z by use frequencies R (A) to R (Z) respectively.

GP($A$)=GPave($A$)×$R(A)$.

GP($B$)=GPave($B$)×$R(B)$.

. . .

GP($Z$)=GPave($Z$)×$R(Z)$.

Thereafter, the process goes to Step 402, wherein a charge/discharge balance BAL (A) of the class A is determined by reducing then average consumption power CPave from the possible power generation amount GP (A) of the class A.

BAL($A$)=GP($A$)−CPave.

Thereafter, the process goes to Step 403, wherein a charge/discharge balance BAL (B) of from the class A to the class B is determined by adding the possible power generation amount GP (B) of the class B to the charge/discharge balance BAL (A) of the class A

BAL($B$)=BAL($A$)+GP($B$)

Hereinafter, the same process is repeated for each class C to Z. Thereby, a charge/discharge balance BAL (C) to BAL (Z) of from the class A to each class C to Z is calculated (Step 404).

$$BAL(C)=BAL(B)+GP(C)$$

$$\ldots$$

$$BAL(Z)=BAL(Y)+GP(Z)$$

Thereafter, the process goes to Step 405a, wherein it is determined whether or not the charge/discharge balance BAL (A) of the class A is greater than zero (whether or not it is a plus value). As a result, when it is determined that the charge/discharge balance BAL (A) of the class A is greater than zero (a plus value), it is determined that the charge/discharge balance is made only with power generation of the class A (a target electric consumption TCFC may be set in the range of the class A). Then the process goes to Step 406a, wherein the target electric consumption TCFC is calculated according to the following equation by using the upper limit value (A), the charge/discharge balance BAL (A) and the possible power generation amount GP (A) of the class A.

$$TCFC=A-(A-0)\times BAL(A)/GP(A)$$

Thereby, the electric consumption in which the charge/discharge balance in the range of the class A amounts to zero is calculated and this electric consumption is set as the target electric consumption TCFC.

On the other hand, when at Step 405a, it is determined that the charge/discharge balance BAL (A) of the class A is zero or less (a minus value), the process goes to Step 405b, wherein it is determined whether or not the charge/discharge balance BAL (B) of from the class A to the class B is greater than zero (whether or not it is a plus value). As a result, when it is determined that the charge/discharge balance BAL (B) of from the class A to the class B is greater than zero (a plus value), it is determined that the charge/discharge balance is made only with power generation of from the class A to the class B (a target electric consumption TCFC may be set in the range of the class B). Then the process goes to Step 406b, wherein the target power generation TCFC is calculated according to the following equation by using the upper limit value (B), the charge/discharge balance BAL (B) and the possible power generation amount GP (B) of the class B.

$$TCFC=B-(B-A)\times BAL(B)/GP(B)$$

Thereby, the electric consumption in which the charge/discharge balance in the range of the class B amounts to zero is calculated and this electric consumption is set as the target electric consumption TCFC.

Hereinafter, the same process is repeated for each class C to Y. Thereby, the minimum class in which the charge/discharge balance is zero or more is searched to calculate electric consumption in which the charge/discharge balance is zero, within the range of the above minimum class. This electric consumption is set as target electric consumption TCFC (Step 405y and Step 406y).

$$TCFC=C-(C-B)\times BAL(C)/GP(C)$$

$$\ldots$$

$$TCFC=Y-(Y-X)\times BAL(Y)/GP(Y)$$

In a case where the charge/discharge balance BAL (Y) of from the class A to the class Y is zero or less (a minus value), even if power generation is made by using the range of from the class A to the class Y, the charge/discharge balance is not to be achieved. Therefore, the process goes to Step 406z, wherein the target electric consumption TCFC is set to the upper limit value [Z] of the class Z as the maximum tolerance electric consumption.

$$TCFC=Z$$

[Determining Routine for Power Generation Execution]

Figure 7:
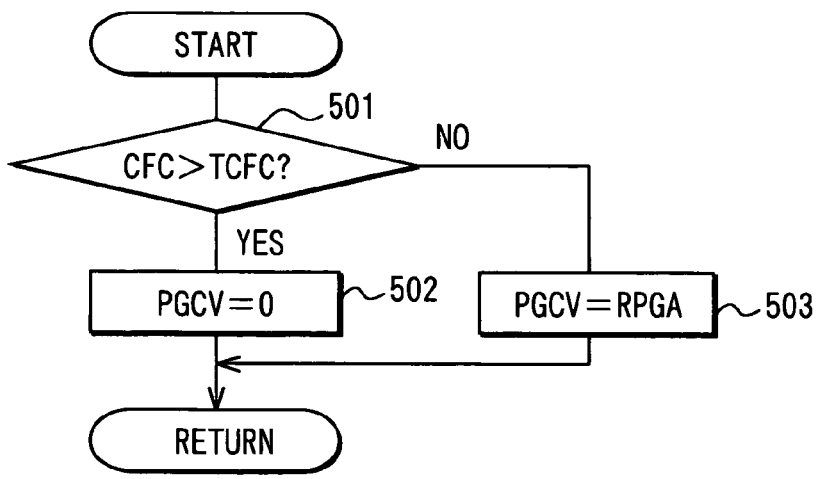
FIG. 7 is a flow chart showing a flow of the process in the determining routine for power generation execution in the first embodiment.

A determining routine of power generation execution in FIG. 7 is executed in a predetermined cycle (for example, 8 ms cycle) during engine operating. When this routine is activated, first at Step 501 it is determined whether or not the present electric consumption CFC is larger than the target electric consumption TCFC. When the present electric consumption CFC is larger than the target electric consumption TCFC, the process goes to Step 502, wherein a power generation command value (PGCV) is set as zero to stop power generation of the alternator 16, thus preventing overcharge of the battery 12. On the other hand, when the present electric consumption CFC is smaller than the target electric consumption TCFC, the process goes to Step 503, wherein a power generation command value is set as a required power generation amount (RPGA). In this way, control electric current is fed to a field coil of the alternator 16 in accordance with the power generation command value during vehicle traveling (engine operating) to generate power in accordance with the required power generation amount. Thereby, the electric consumption CFC is controlled to the target electric consumption TCFC to control a charging rate (SOC) of the battery 12 to the vicinity of a target charging rate. The required power generation amount is in advance set from the present engine rotational speed, the maximum possible power generation amount or the power generation efficiency of the alternator 16.

In the first embodiment as described above, the electric consumption CFC as an increment of the fuel consumption rate per unit power generation amount is controlled to the target electric consumption TCFC. Therefore, as compared to the conventional power generation control system in which the operating condition for performing power generation is determined by a map in advance set, the power generation control is less affected by accuracy of the map, use environments of a vehicle (a difference in travel road condition, a difference in vehicle speed and a difference in acceleration/deceleration by a driver or the like) or variations in vehicle characteristic. Therefore, an increment of the fuel consumption caused by power generation can be certainly reduced while securing the required power generation amount, thus leading to an improvement in both the fuel consumption rate and charge/discharge balance of the battery.

Further, in the first embodiment, the target electric consumption TCFC is set so that the charge/discharge balance of the battery 12 amounts to zero and therefore, the battery 12 can be charged with the minimum required power generation amount in just proportion.

In addition, in the first embodiment, the target electric consumption TCFC is set based upon the use-frequency, the possible power generation amount and the average consumption power for each class of the electric consumption CFC in the past travel history. Therefore, the target electric consumption TCFC can be accurately and automatically set in response to use environments (a difference in travel road condition, a difference in vehicle speed and a difference in acceleration/deceleration by a driver or the like) of a vehicle or variations in vehicle characteristic.

In this case, the target electric consumption TCFC may be set only based upon use environments of a vehicle for each class of the electric consumption CFC in the past travel history or based upon the use-frequency and the possible power generation amount for each class of the electric consumption CFC.

Second Embodiment

The calculating routine for the electric consumption, the accumulating routine for the electric consumption, the calculating routine for the electric consumption class data, the calculating routine for the average consumption power and the calculating routine for the target electric consumption, similar to the first embodiment are executed. Thereafter, the following routine is executed.

[Calculating Routine for Correction Amount of Target Electric Consumption]

Figure 8:
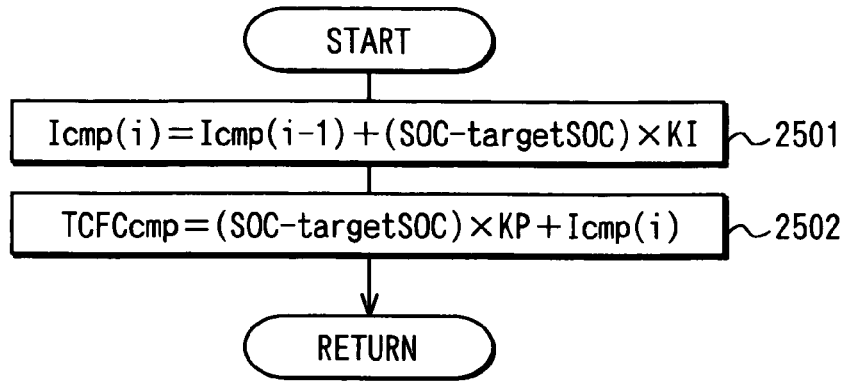
FIG. 8 is a flow chart showing a flow of the process in the calculating routine for a correction amount of target electric consumption in a second embodiment of the present invention.

A calculating routine for a correction amount of target electric consumption in FIG. 8 is executed in a predetermined cycle (for example, 8 ms cycle) during engine operating and a correction amount of the target electric consumption TCFCcmp is calculated as follows. When this routine is activated, first at Step 2501, the I term (integral term) correction amount I cmp (i) is calculated according to the following equation for performing feedback correction on the target electric consumption TCFC in such a manner that a deviation between the present SOC (battery charging rate) and a target SOC is reduced to be smaller.

$$Icmp(i)=Icmp(i-I)+(SOC-\text{target SOC})\times KI$$

$$SOC=\text{present charging amount/full charging amount}\times 100(\%),$$

wherein I cmp (i–I) denotes the previous I term correction amount and KI denotes an I term gain.

Thereafter, the process goes to Step 2502, wherein the correction amount of the target electric consumption TCFCcmp is determined by addition of a P term (proportional term) correction amount P cmp (i) and an I term correction amount I cmp (i) for performing feedback correction on the target electric consumption TCFC by PI control (proportional integral control).

$$TCFCcmp=Pcmp(i)+Icmp(i)=(SOC-\text{target SOC})\times KP+Icmp(i),$$

wherein KP denotes a P term gain.

[Determining Routine for Power Generation Execution]

Figure 9:
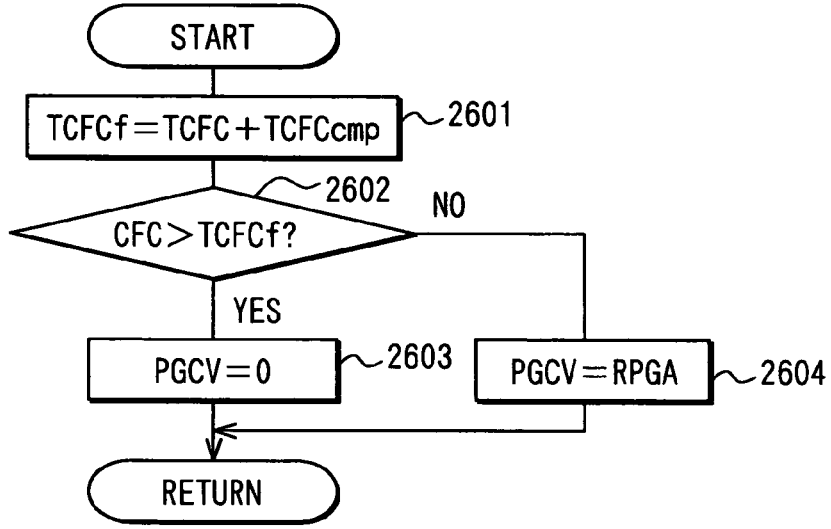
FIG. 9 is a flow chart showing a flow of the process in the determining routine for power generation execution in the second embodiment.

A determining routine of power generation execution in FIG. 9 is executed in a predetermined cycle (for example, 8 ms cycle) during engine operating. When this routine is activated, first at Step 2601, the correction amount TCFCcmp of the above target electric consumption amount is added to the target electric consumption TCFC calculated at the calculating routine for the target electric consumption. Thereby, a final target electric consumption TCFCf is determined by correcting the target electric consumption TCFC with the correction amount TCFCcmp of the target electric consumption amount.

$$TCFCf=TCFC+TCFCcmp$$

Thereafter, the process goes to Step 2602, wherein it is determined whether or not the present electric consumption CFC is larger than the final target electric consumption TCFCf. When the present electric consumption CFC is larger than the final target electric consumption TCFCf, the process goes to Step 2603, wherein a power generation command value (PGCV) is set as zero to stop power generation of the alternator 16, thus preventing overcharge of the battery 12.

On the other hand, when the present electric consumption CFC is smaller than the final target electric consumption TCFCf, the process goes to Step 2604, wherein a power generation command value (PGCV) is set as a required power generation amount (RPGA). In this way, control electric current is fed to a field coil of the alternator 16 in accordance with the power generation command value during vehicle traveling (engine operating) to generate power in accordance with the required power generation amount. Thereby, the electric consumption CFC is controlled to the final target electric consumption TCFCf to converge a charging rate (SOC) of the battery 12 on a target charging rate (SOC). The required power generation amount is calculated with a map or the like in accordance with the present engine rotational speed.

In the second embodiment as described above, the power generation of the alternator 16 is controlled by comparing the electric consumption CFC as an increment of the fuel consumption rate per unit power generation amount with the final target electric consumption TCFCf corrected in accordance with the charging rate (SOC) of the battery 12. Therefore, as compared to the conventional power generation control system in which the operating condition for performing power generation is determined by a map in advance set, the power generation control is less affected by accuracy of the map, use environments of a vehicle (a difference in travel road condition, a difference in vehicle speed and a difference in acceleration/deceleration by a driver or the like) or variations in vehicle characteristic. Therefore, the required power generation amount is secured in accordance with the actual charging rate (SOC) of the battery 12, while reducing the increment of the fuel consumption certainly, thus leading to an improvement in both the fuel consumption rate and the charge/discharge balance of the battery.

Third Embodiment

In the second embodiment, a reference point of the charge/discharge balance of the battery 12 is set as zero. However, In a third embodiment of the present invention shown in FIGS. 10 and 11, a reference point of the charge/discharge balance of the battery 12 is to be corrected in accordance with a charge/discharging amount required for making the SOC of the battery 12 be equal to a target SOC.

Figure 10:
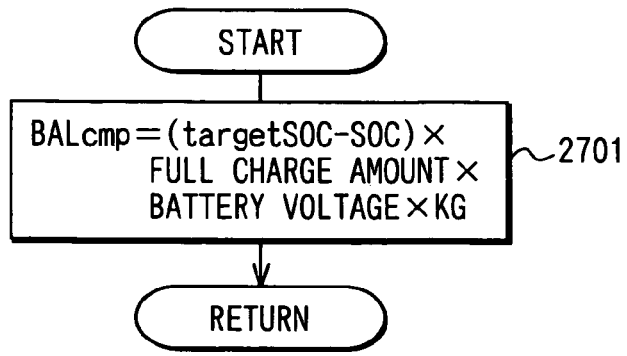
FIG. 10 is a flow chart showing a flow of the process in the calculating routine for a correction amount of a charge/discharge balance reference point in a third embodiment of the present invention.

A calculating routine for a correction amount in the reference point of the charge/discharge balance in FIG. 10 is executed in a predetermined cycle (for example, 8 ms cycle) during engine operating. When this routine is activated, first at Step 2701, a deviation between the present SOC and the target SOC is multiplied by a full charging amount and a battery voltage to calculate a charging/discharging amount required for making the SOC of the battery 12 be equal to the target SOC. The correction amount BALcmp in the reference point of the charge/discharge balance is determined by multiplying this calculated charge/discharging amount by a correction gain KG.

$$BALcmp=(\text{target SOC}-SOC)\times\text{full charging amount}\times\text{battery voltage}\times KG$$

In the calculating routine for the target electric consumption in FIG. 6 to be executed in the above first embodiment, at Step 405a to Step 405y the reference point of the charge/discharge balance BAL (A) to BAL (Y) of each class A to Y is set as zero. Thereby, the minimum class for balancing the charge/discharge is searched based upon whether or not the charge/discharge balance BAL (A) to BAL (Y) of each class A to Y is greater than zero. However, in the calculating routine for the target electric consumption in FIG. 11 to be executed in the third embodiment, at Step 405a' to Step 405y' a reference point of the charge/discharge balance BAL (A) to BAL (Y) of each class A to Y is set as the correction amount BALcmp in the reference point of the charge/discharge balance calculated at the calculating routine for the correction amount in the reference point of the charge/discharge balance in FIG. 10. Thereby, the minimum class in which the charge/discharge of the battery 12 is more than the correction amount BALcmp in the reference point of the charge/discharge balance is searched based upon whether or not the charge/discharge balance BAL (A) to BAL (Y) of each class A to Y is greater than the correction amount BALcmp in the reference point of the charge/discharge balance. The electric consumption in which the charge/discharge balance is equal to the correction amount BALcmp in the reference point of the charge/discharge balance is calculated in the range of the minimum class to set this electric consumption as the target electric consumption TCFC (Step 406a' to Step 406y').

$$TCFC = A - (A-0) \times \{BAL(A) - BALcmp\}/GP(A)$$

$$TCFC = B - (B-A) \times \{BAL(B) - BALcmp\}/GP(B)$$

$$TCFC = C - (C-B) \times \{BAL(C) - BALcmp\}/GP(C)$$

. . .

$$TCFC = Y - (Y-X) \times \{BAL(Y) - BALcmp\}/GP(Y)$$

Figure 11:
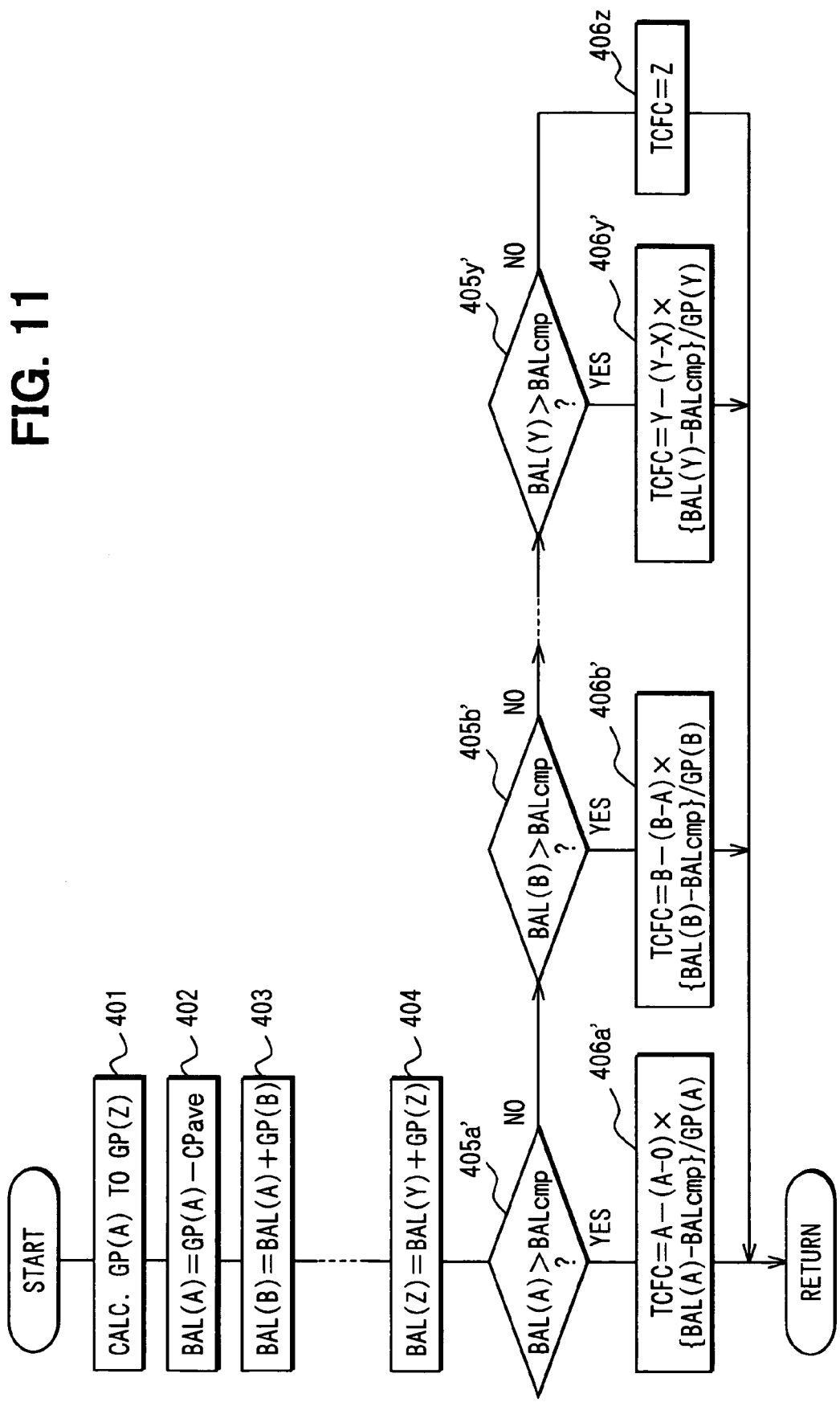
FIG. 11 is a flow chart showing a flow of the process in the calculating routine for target electric consumption in the third embodiment.

A calculating routine for a target electric consumption in FIG. 11 has the same process as the process of each Step in the calculating routine for the target electric consumption in FIG. 6, except for Steps 405a' to Step 405y' and 406a' to 406y'.

A determining routine for power generation execution performs the same process as in the routine shown in FIG. 7.

In the third embodiment as described above, the correction amount BALcmp in the reference point of the charge/discharge balance is calculated in accordance with the charge/discharging amount required for making the SOC of the battery 12 be equal to the target SOC. The minimum class in which the charge/discharge balance BAL (A) to BAL (Y) of each class A to Y is more than the correction amount BALcmp in the reference point of the charge/discharge balance is searched to calculate the electric consumption in which the charge/discharge balance is equal to the correction amount BALcmp in the reference point of the charge/discharge balance within the range of this minimum class for setting this electric consumption as the target electric consumption TCFC. As a result, the third embodiment can meet a demand for low fuel consumption and also improve converging properties on the target SOC of the battery 12.

Fourth Embodiment

In a fourth embodiment, each time when the sample number of data used for calculating a target electric consumption reaches a predetermined number NFC Imt (each time one sample period ends), the sample number is initialized and also a final value of the data is stored in a memory (memory means) of the control device 11. In addition, the data of this time's sample period is corrected by using the final value of the data of the previous sample period stored in the memory, in accordance with the sample number of this time's sample period started after the final value of the data is stored, calculating the target electric consumption based upon the corrected data. In this way, even when the sample number of this time's sample period is small, the final value of the data of the previous sample period is appropriately reflected in the data of this time's sample period, maintaining continuity and reliability of the target electric consumption.

The calculating routine for the electric consumption is executed based with reference to FIG. 3, the same as in the first embodiment.

[Accumulating Routine for Electric Consumption Class Data]

Figure 12:
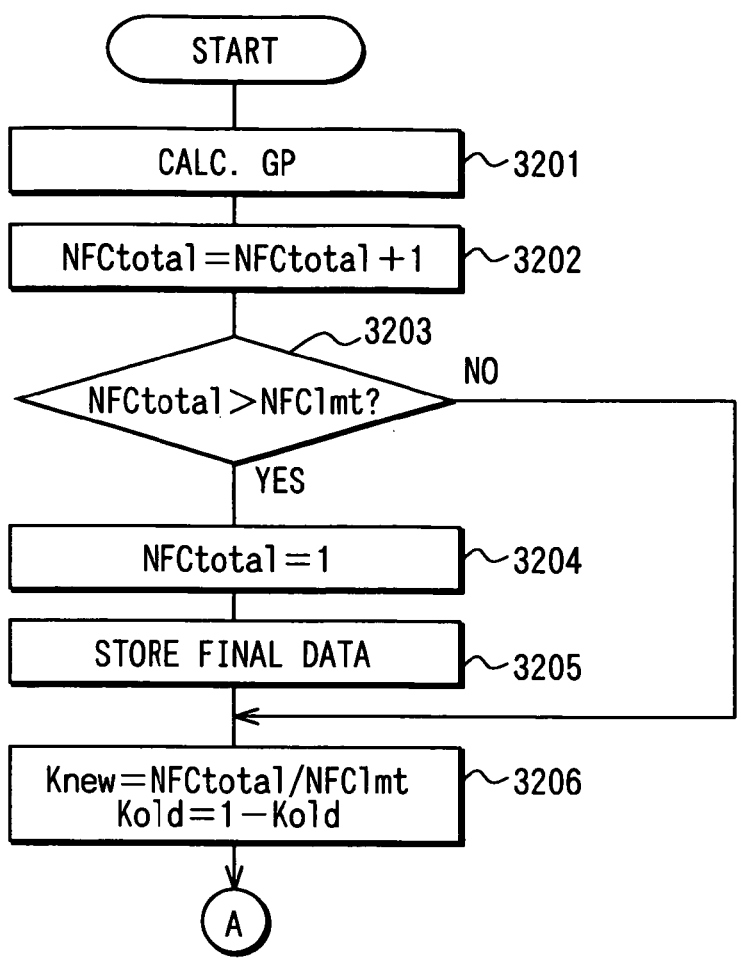
FIG. 12 is a flow chart showing a flow of the process of the former half in the accumulating routine for electric consumption class data in a fourth embodiment of the present invention.
Figure 13:
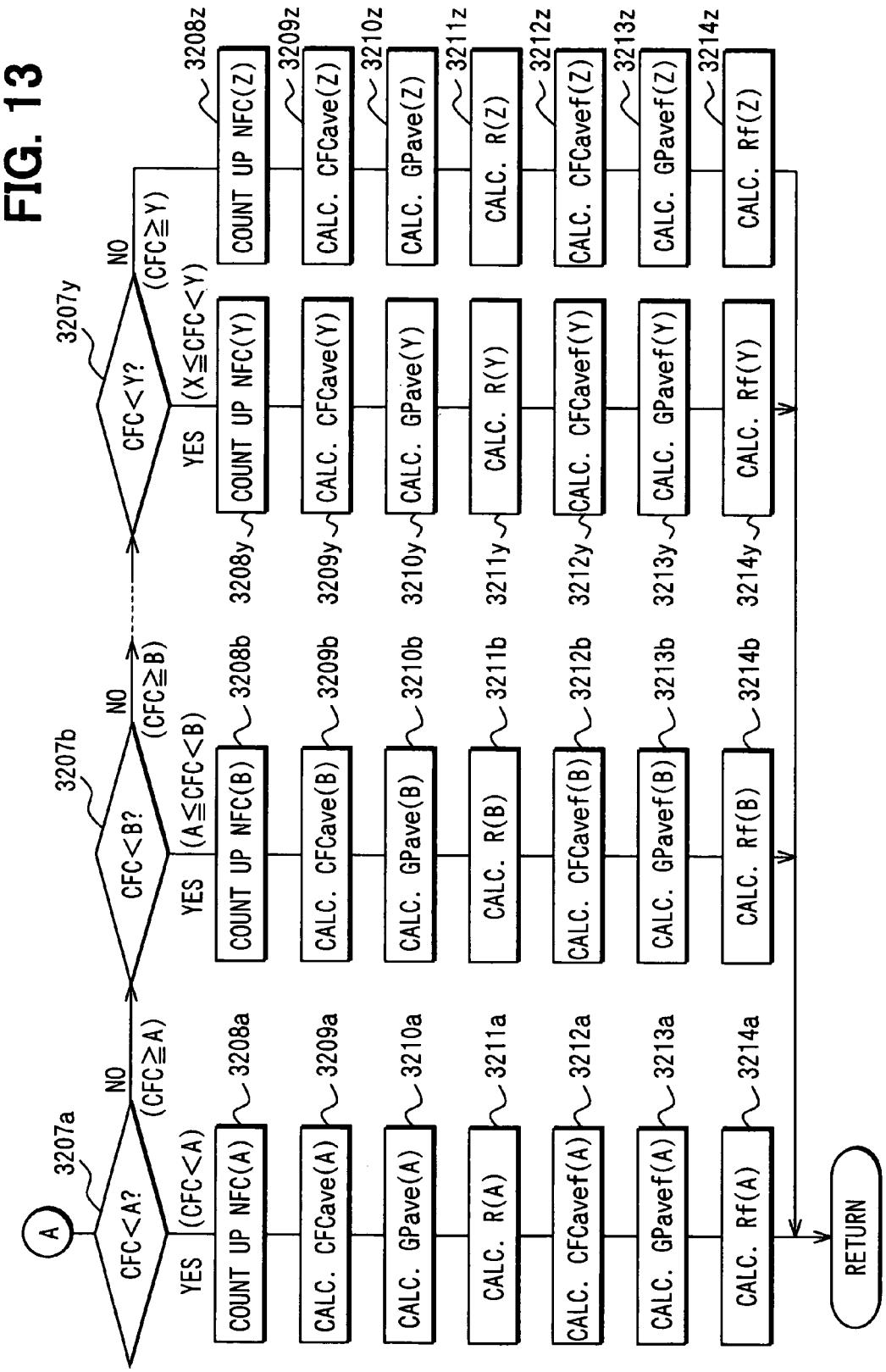
FIG. 13 is a flow chart showing a flow of the process of the latter half in the accumulating routine for the electric consumption class data in the fourth embodiment.

An accumulating routine of electric consumption class data in FIGS. 12 and 13 is executed in a predetermined cycle (for example, 8 ms cycle) during engine operating. Thereby, use-frequency of the electric consumption CFC, an average value of the electric consumption and an average value of the possible power generation amount for each class in the past travel history are calculated as follows and theses calculated data are accumulated in the memory of the control device 11.

When this routine is activated, first at Step 3201, a possible power generation amount GP in accordance with the present engine rotational speed is calculated from the map showing the relation between engine rotational speeds and power generation characteristics of the alternator 16. Then the process goes to Step 3202, wherein a count value of the present total sample number NFC total counts up. Then the process goes to Step 3203, wherein it is determined whether or not the present total sample number NFC total exceeds a predetermined value NFC Imt which is equivalent to the total sample number of the one entire sample period. When the present total sample number NFC total does not exceed the predetermined number NFC Imt, it is determined that the process is in the halfway of the sample period and the process goes to Step 3206, wherein correction coefficients K new and K old to the present and past data are calculated by using the present total sample number NFC total and the predetermined number NFC Imt.

$$K\text{new} = NFC\text{ total}/NFC\text{ Imt} \qquad (1)$$

$$K\text{old} = 1 - K\text{new} \qquad (2)$$

In contrast to this, when it is determined at Step 3203 that the present total sample number NFC total exceeds the predetermined number NFC Imt, it is determined that the process comes to end timing of one sample period, and the process goes to Step 3204, wherein the counter of the total sample number NFC total is reset to return the total sample number NFC total to an initial value "1". Then, at Step 3205, data of the electric consumption average value CFCave (A) to CFCave (Z), the possible power generation amount average value GPave (A) to GPave (Z), the use-frequency R (A) to R (Z) of each class A to Z calculated by executing this previous routine and the average consumption power CPave calculated at a calculating routine for average consumption power in FIG. 14 to be described later are stored in the memory (memory means) of the control device 11 as the final values CFCavebf (A) to CFCavebf (Z), GPavebf (A) to GPavebf (Z), R bf (A) to R bf (Z) and CPavebf of each data of the previous sample period.

[Memory of the Final Value of the Electric Consumption Average Value CFCave of each class A to Z]

$CFCavebf(A) = CFCave(A)$ $CFCavebf(B) = CFCave(B)$

. . .

$CFCavebf(Z) = CFCave(Z)$

[Memory of the Final Value of the Possible Power Generation Amount Average Value GPave of Each Class A to Z]

$GPavebf(A) = GPave(A)$ $GPavebf(B) = GPave(B)$

. . .

$GPavebf(Z) = GPave(Z)$

[Memory of the Final Value of the Use-Frequency R of Each Class A to Z]

$Rbf(A) = R(A)$ $Rbf(B) = R(B)$

. . .

$Rbf(Z) = R(Z)$

[Memory of the Final Value of the Average Consumption Power CPave]

$CPavebf = CPave$

Thereafter, the process goes to Step 3206, wherein correction coefficients K new and K old to the present and past data are calculated according to the above equations (1) and (2) by using the present total sample number NFC total and the predetermined number NFC lmt. Since the process of Step 3206 is executed even in a case where "No" determination is made at Step 3203, correction coefficients K new and K old to the present and past data are calculated in a predetermined calculation cycle (for example, 8 ms cycle) during engine operating.

Then, the process goes to Step 3207a in FIG. 13, wherein it is determined whether or not this time's electric consumption CFC is included in the class A as the minimum class (whether or not electric consumption CFC<A). When this time's electric consumption CFC is included in the class A, the data in the class A are updated as follows.

First, at Step 3208a, a count value of the sample number NFC (A) of the class A counts up and then, the process goes to Step 3209a, wherein this time's electric consumption average value CFCave (A) of the class A in the present sample period is calculated according the following equation from the previous electric consumption average value old CFCave (A), the previous sample number NFC (A), and this time's electric consumption CFC of the class A.

$CFCave(A) = [\text{old } CFCave(A) \times \{NFC(A)-1\} + CFC] / NFC(A)$

Next, the process goes to Step 3210a, wherein this time's possible power generation amount average value GPave (A) of the class A in the present sample period is calculated according the following equation from the previous possible power generation amount old GPave (A) and the previous sample number NFC (A), and this time's possible power generation amount GP of the class A.

$GPave(A) = [\text{old } GPave(A) \times \{NFC(A)-1\} + GP] / NFC(A)$

Thereafter, the process goes to Step 3211a, wherein the sample number NFC (A) of the class A is divided by the total sample number NFC total of all classes A to Z to determine this time's use-frequency of the class A in the present sample period.

$R(A) = NFC(A) / NFC \text{ total}$

Thereafter, the process goes to Step 3212a, wherein a final electric consumption average value CFCavef (A) of the class A in the present sample period is calculated according to the following equation from this time's electric consumption average value CFCave (A) of the class A in the present sample period, the final value CFCavebf (A) of the electric consumption average value of the class A in the previous sample period stored in the memory of the control device 11, and the correction coefficients K new and K old to the present and past data.

$CFCavef(A) = CFCavebf(A) \times K \text{ old} + CFCave(A) \times K \text{ new}$ The above equation shows that a weighted average value between this time's electric consumption average value CFCave (A) of the class A in the present sample period and the final value CFCavebf (A) of the electric consumption average value of the class A in the previous sample period is calculated and the weighted average value is set as the final electric consumption average value CFCavef (A) of the class A in the present sample period. The weighting factor (K new or K old) is set in accordance with the total sample number NFC total of the present sample period (Step 3206).

Thereafter, the process goes to Step 3213a, wherein a final possible power generation amount average value GPavef (A) of the class A in the present sample period is calculated according to the following equation from this time's possible power generation amount average value GPave (A) of the class A in the present sample period, a final value GPavebf (A) of the possible power generation amount average value of the class A in the previous sample period stored in the memory, and correction coefficients K new and K old to the present and past data.

$GPavef(A) = GPavebf(A) \times K \text{old} + GPave(A) \times K \text{new}$

Thereafter, the process goes to Step 3214a, wherein a final use-frequency Rf (A) of the class A in the present sample period is calculated according to the following equation from this time's use-frequency R ave (A) of the class A in the present sample period, a final value R bf (A) of the use-frequency of the class A in the previous sample period stored in the memory, and correction coefficients K new and K old to the present and past data.

$Rf(A) = Rbf(A) \times K \text{ old} + R(A) \times K \text{ new}$

On the other hand, when it is determined at Step 3207a that this time's electric consumption CFC is not included in the class A, the process goes to Step 3207b, wherein it is determined whether or not this time's electric consumption CFC is included in the class B larger next to the class A (whether or not A≦electric consumption CFC<B). When this time's electric consumption CFC is included in the class B, processes of Step 3208b to Step 3214b are executed to calculate, with the same method as described above, the sample number NFC (B), the electric consumption average value CFCave (B), the possible power generation average value GPave (B), the use-frequency R (B), the final electric consumption average value CFCavef (B), the final possible power generation amount average value GPavef (B) and the final use-frequency R f (B) of the class B in the present sample period, and the corresponding memory data are updated with these calculated data.

Subsequently, also with respect to from the class C to class Z, the electric consumption average value CFCave (C) to CFCave (Z), the possible power generation amount average value GPave (C) to GPave (Z), the use-frequency R (C) to R (Z), the final electric consumption average value CFCavef (C) to CFCavef (Z), the final possible power generation amount average value GPavef (C) to GPavef (Z) and the final use-frequency R f (C) to R f (Z) are calculated with the same method as described above during engine operating, and the corresponding memory data are updated with these calculated data.

[Calculating Routine for Average Consumption Power]

Figure 14:
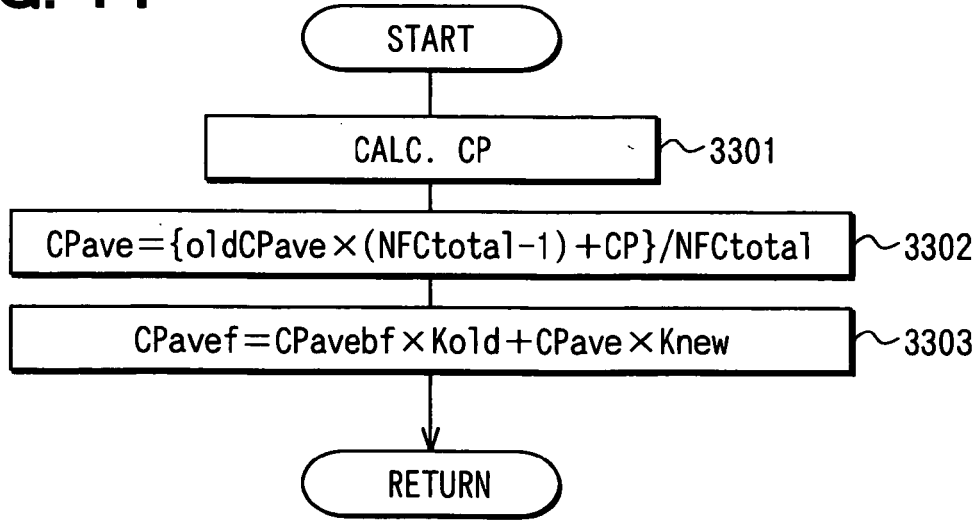
FIG. 14 is a flow chart showing a flow of the process in the calculating routine for average consumption power in the fourth embodiment.

A calculating routine of average consumption power in FIG. 14 is executed in a predetermined cycle (for example, 8 ms cycle) during engine operating. When this routine is activated, first at Step 3301 consumption power CP per calculation cycle consumed in a vehicle is calculated. Thereafter, the process goes to Step 3302, wherein average consumption power CPave is calculated according to the following equation from the previous average consumption power old CPave, the total sample number NFC total and this time's consumption power CP in the present sample period.

CPave={old CPave×(NFCtotal−1)+CP}/NFC total.

Thereafter, the process goes to Step 3303, wherein final average consumption power CPavef in the present sample period is calculated according to the following equation from this time's average consumption power CPave calculated at Step 3302 of the class A in the present sample period, a final value CPavebf of the average consumption power in the previous sample period stored in the memory of the control device 11, and the correction coefficients K new and K old to the present and past data.

CPavef=CPavebf×*K* old+CPave×*K* new

The above equation shows that a weighted average value between this time's average consumption power CPave in the present sample period and the final value CPavebf of the average consumption power in the previous sample period is calculated by using the correction coefficients K new and K old to the present and past data as a weighting factor and the weighted average value is set as the final electric consumption average value CFCavef (A) in the present sample period. The weighting factor (K new or K old) is set in accordance with the total sample number NFC total of the present sample period (Step 3206 in FIG. 12).

In the calculating routine for the target electric consumption, the calculating routine for the target electric consumption correction amount and the determining routine for the power generation execution, the processes shown in FIGS. 6, 8 and 9 are executed in the same way as the first embodiment.

In the fourth embodiment, each time when the sample number of data of the electric consumption class comes to a predetermined number (each time one sample period ends), the sample number is initialized to calculate use-frequency of the electric consumption in a new sample period in a predetermined calculation cycle. Therefore, it is prevented that the data of the use-frequency of the electric consumption are too old, thus making it possible to set a target electric consumption to a more appropriate value in accordance with the present traveling state or the battery state and efficiently generate power with less fuel.

Further, in the fourth embodiment, each time when the sample number of data of the electric consumption class, a final value of the data is stored in a memory, data of this time's sample period is corrected by using the final value of the data of the previous sample period stored in the memory, in accordance with the sample number of this time's sample period started after the final value of the data is stored to calculate the target electric consumption based upon the corrected data. Therefore, even when the sample number of this time's sample period is small, the final value of the data of the previous sample period is appropriately reflected in the data of this time's sample period, maintaining continuity and reliability of the target electric consumption.

Fifth Embodiment

In the fourth embodiment, the sample number of one sample period is set to a predetermined number NFC Imt. However, as shown in FIGS. 15 to 17, the sample number NFC Imt of one sample period may be set based upon at least one of a remaining charging amount SOC which is an index representing a charging/discharging state of the battery 12, a battery capacity (Ah) and average consumption power by a map or a mathematical n expression.

In addition, in the calculating routine for the correction amount of the target electric consumption in FIG. 8 explained in the fourth embodiment, a feedback gain KI or KP is used for calculating a correction amount for performing feedback correction on the target electric consumption with PI control in such a way as to reduce the deviation between the present SOC and the target SOC. This feedback gain may be determined based upon at least one of the remaining charging amount SOC of the battery 12, the battery capacity (Ah) and the average consumption power.

In the calculating routine for the correction amount of the reference point of the charging and discharging balance in FIG. 10, the correction gain KG used for performing feedback correction on the correction amount BALcmp of the reference point of the charge/discharge balance in accordance with the deviation between the present SOC and the target SOC or the like may be determined by at least one of the remaining charging amount SOC of the battery 12, the battery capacity (Ah) and the average consumption power.

For example, as shown in FIG. 15, in a case of determining a sample number NFC Imt in one sample period in accordance with a remaining charging amount SOC of the battery 12, as the remaining charging amount SOC of the battery 12 is closer to the target SOC (for example, 90%), the sample number NFC Imt in the one sample period may be increased. In this way, when the remaining charging amount SOC of the battery 12 is close to the target SOC, target electric consumption is set by using data accumulated over a long period of time to search the condition on which an increment of the fuel consumption by power generation is reduced more, thereby generating power. On the other hand, when the remaining charging amount SOC of the battery 12 is away from the target SOC, the target electric consumption is set by using data in the near past, so that control for more quickly returning the remaining charging amount SOC of the battery 12 back to the target SOC is possible. As a result, both the fuel consumption reduction and the charge/discharge balance are possible while controlling the remaining charging amount SOC of the battery 12 to the target SOC.

In addition, as shown in FIG. 16, in a case of determining a sample number NFC Imt in one sample period in accordance with a battery capacity, as the battery capacity is larger, the sample number NFC Imt in the one sample period may be increased. In this way, when the battery capacity (tolerance degree of the charging/discharging) is large, the target electric consumption is set by using data accumulated over a long period of time to search the condition on which an increment of the fuel consumption by power generation is reduced more, thereby generating power. On the other hand, when the battery capacity (tolerance degree of the charging/discharging) is small, the target electric consumption is set by using data in the near past, so that the control for more quickly returning the remaining charging amount SOC of the battery 12 back to the target SOC is possible. As a result, both the fuel consumption reduction and the charge/discharge balance are possible while controlling power generation in accordance with the battery capacity (tolerance degree of the charging/discharging amount).

Further, as shown in FIG. 17, in a case of determining a sample number NFC lmt in one sample period in accordance with an average consumption power, as the average consumption power is reduced more, the sample number NFC lmt in the one sample period may be increased. In this way, when the average consumption power is small and the discharging amount of the battery 12 is small, the target electric consumption is set in consideration of vehicle traveling states over a long period of time to search the condition on which an increment of the fuel consumption by power generation is reduced more, thereby generating power. On the other hand, when the average consumption power is large and the discharging amount of the battery 12 is large, the target electric consumption is set in consideration of recent traveling states, so that the control for more quickly returning the remaining charging amount SOC of the battery 12 back to the target SOC is possible. As a result, both the fuel consumption reduction and the charge/discharge balance are possible while controlling power generation in accordance with the average consumption power (discharging amount of the battery 12).

In addition, as shown in FIG. 18, in a case of determining a F/B gain (KI, KP or KG) in accordance with a remaining charging amount SOC of the battery 12, as the remaining charging amount SOC of the battery 12 is closer to the target SOC (for example, 90%), a correction coefficient K cmp to the F/B gain (KI, KP or KG) may be decreased. In this case, each of the reference gains KI base, KP base and KG base may be corrected with the correction coefficient K cmp for determination.

$KI=KI\ base \times K\ cmp$ $KP=KP\ base \times K\ cmp$ $KG=KG\ base \times K\ cmp$ In this way, when the remaining charging amount of the battery 12 is away from the target SOC, the F/B gain (KI, KP or KG) is increased to more quickly return the remaining charging amount SOC of the battery 12 back to the target SOC. On the other hand, when the remaining charging amount of the battery 12 is close to the target SOC, the F/B gain (KI, KP or KG) is decreased to weaken converging properties on the target SOC. Accordingly, the power generation is stopped or the power generation amount is reduced, thus improving a fuel saving effect.

Figures 19, 20, 21:
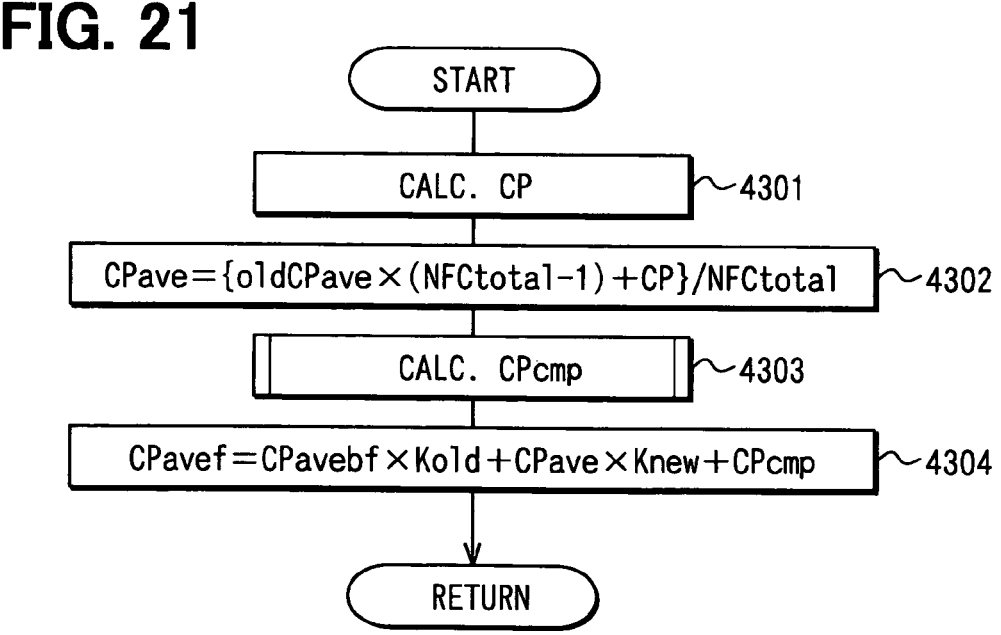
FIG. 19 is a table showing one example of a map for determining a correction coefficient to a F/B gain in accordance with a battery capacity in the fifth embodiment.
FIG. 20 is a table showing one example of a map for determining a correction coefficient to a F/B gain in accordance with average consumption power in the fifth embodiment.
FIG. 21 is a flow chart showing a flow of the process in the calculating routine for average consumption power in a sixth embodiment of the present invention.

In addition, as shown in FIG. 19, in a case of determining a F/B gain (KI, KP or KG) in accordance with a battery capacity, as the battery capacity is increased, a correction coefficient K cmp to the F/B gain (KI, KP or KG) may be decreased. In this way, when the battery capacity (tolerance degree of the charging/discharging amount) is small, the F/B gain (KI, KP or KG) is increased to more quickly return the remaining charging amount SOC of the battery 12 back to the target SOC. On the other hand, when the battery capacity (tolerance degree of the charging/discharging amount) is large, the F/B gain (KI, KP or KG) is decreased to weaken converging properties on the target SOC. Accordingly, the power generation is stopped or the power generation amount is reduced, thus improving a fuel saving effect.

In addition, as shown in FIG. 20, in a case of determining a F/B gain (KI, KP or KG) in accordance with an average consumption power, as the average consumption power is decreased, a correction coefficient K cmp to the F/B gain (KI, KP or KG) may be decreased. In this way, when the average consumption power is large and the discharging amount of the battery 12 is large, the F/B gain (KI, KP or KG) is increased to more quickly return the remaining charging amount SOC of the battery 12 back to the target SOC. On the other hand, the average consumption amount is small and the discharging amount of the battery 12 is small, the F/B gain (KI, KP or KG) is decreased to weaken converging properties on the target SOC. Accordingly, the power generation is stopped or the power generation amount is reduced, thus improving a fuel saving effect.

Sixth Embodiment

In the sixth embodiment, each time when the sample number of data for calculating a target electric consumption comes to a predetermined number (each time one sample period ends), the sample number is initialized and also a final value of the data is stored in a memory of the control device 11. Data in this time's sample period is corrected by using the final value of the data in the previous sample period stored in the memory, in accordance with the sample number in this time's sample period started after the final value of the data is stored. Then, the target electric consumption is calculated based upon the corrected data. In this way, even when the sample number in this time's sample period is small, the final value of the data in the previous sample period is appropriately reflected in the data in this time's sample period, maintaining continuity and reliability of the target electric consumption.

In addition, in the sixth embodiment, an average consumption power in the past travel history (an average consumption power for this time's sample period) is calculated, a changing amount of the future consumption power is estimated based upon a deviation between the average consumption power in the past travel history and the present consumption power and a converging value of the future average consumption power is estimated based upon the average consumption power in the past travel history and the estimated changing amount of the future consumption power. The estimated converging value of the estimated future average consumption power is used to calculate the target increment of the fuel consumption. In this way, the change of the future consumption power is estimated and thereby a target increment of the fuel consumption can be set in such a way as to quickly balance the future charging amount with the future discharging amount of the battery. Accordingly, even under the condition where the consumption power relatively largely changes, the change of the consumption power is followed up in good response, enabling an improvement on both charging/discharging balance and fuel consumption reduction.

The calculating routine for the electric consumption will be executed based upon the flow chart shown in FIG. 3. The accumulating routine for the electric consumption class data will be executed based upon a flow chart shown in FIGS. 12 and 13.

[Calculating Routine for Average Consumption Power]

A calculating routine of average consumption power in FIG. 21 is executed in a predetermined cycle (for example, 8 ms cycle) during engine operating and serves as a consumption power information calculator and future consumption power estimating means, together with a calculating routine for a consumption power correction value in FIG. 22, which will be described later.

When this routine is activated, first at Step 4301, consumption power CP per calculation cycle consumed in a vehicle is calculated. Thereafter, the process goes to Step 4302, wherein this time's average consumption power CPave in the present sample period is calculated according to the following equation from the previous average consumption power old CPave in the present sample period, the total sample number NFC total and this time's consumption power CP.

$$CPave=\{old\ CPave\times(NFC\ total-1)+CP\}/NFC\ total.$$

Thereafter, the process goes to Step 4303, wherein a calculating routine for a consumption power correction value in FIG. 22 to be described later is executed to estimate a change of the future consumption power, thus calculating the consumption power correction value CPcmp (estimated change amount of the future consumption power) for changing a target electric consumption TCFCf in a feed forward way to be described later.

Thereafter, the process goes to Step 4304, wherein a final average consumption power CPavef in the present sample period is calculated according to the following equation from this time's average consumption power CPave calculated at Step 4302, a final value CPavebf of the average consumption power in the previous sample period stored in the memory of the control device 11, the correction coefficients Knew and Kold to the present and past data and a correction value CPavef of the consumption power CPcmp for responding to the change of the future consumption power.

$$CPavef=CPavebf\times Kold+CPave\times Knew+CPcmp \qquad (3)$$

The above equation shows that a weighted average value between this time's average consumption power CPave in the present sample period and the final value CPavebf of the average consumption power in the previous sample period is calculated by using the correction coefficients Knew and Kold to the present and past data as a weighting factor, and the final average consumption power CPavef in the present sample period is set by adding the consumption power correction value CPcmp for responding to the change of the future consumption power to the weighted average value. The weighting factor (Knew or Kold) is set in accordance with the total sample number NFC total in the present sample period (Step 3206 in FIG. 12).

[Calculating Routine for Correction Value of Consumption Power]

Figure 22:
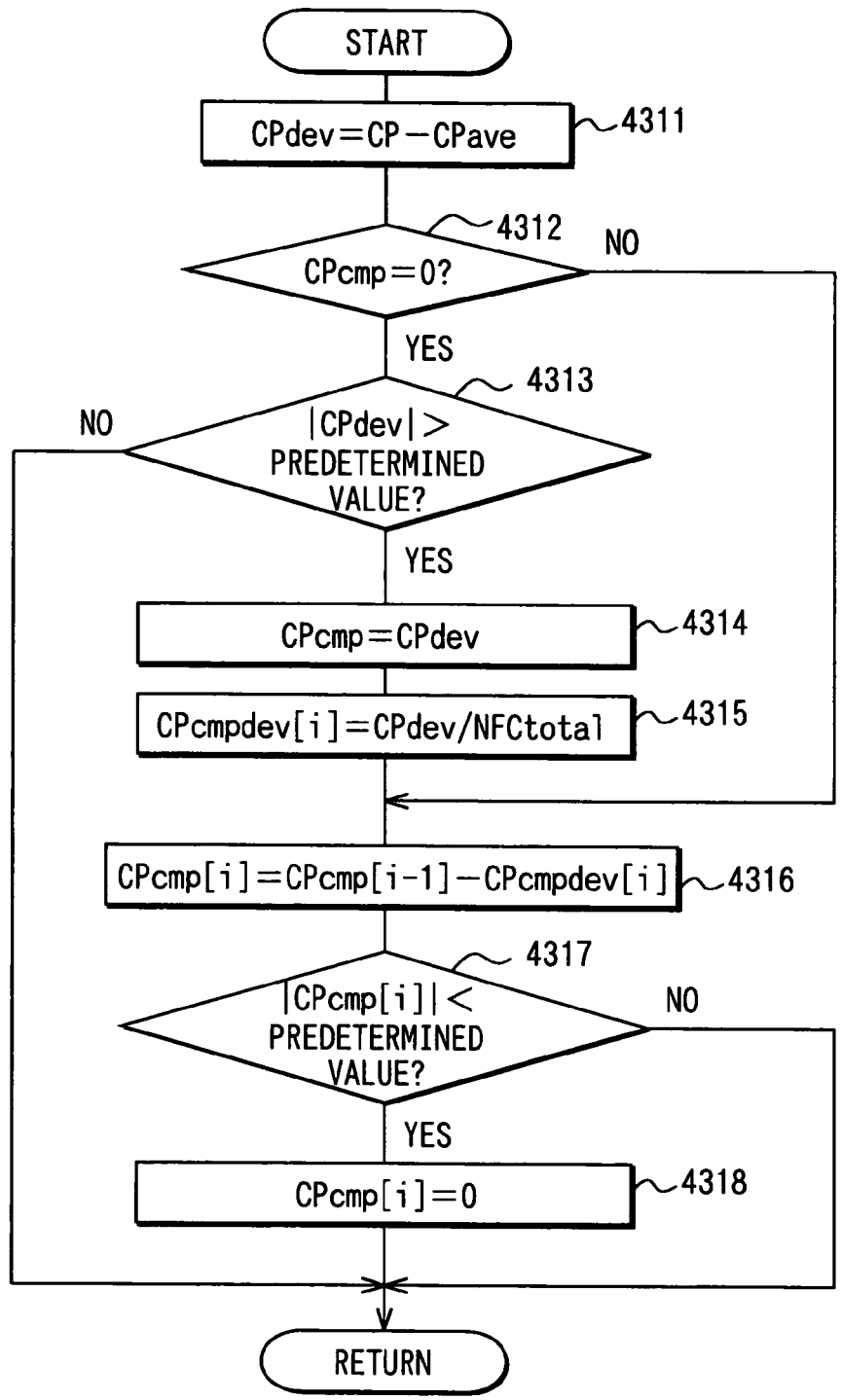
FIG. 22 is a flow chart showing a flow of the process in the calculating routine for a correction amount of consumption power in the sixth embodiment.

A calculating routine for a correction value of the consumption power in FIG. 22 is a sub routine executed at Step 4303 in the calculating routine of the average consumption power in FIG. 21. When this routine is activated, first at Step 4311, a deviation (hereinafter referred to as consumption power deviation) CPdev between the present consumption power CP and the average consumption power CPave in the present sample period (the past travel history) calculated at Steps 4301 and 4302 for the calculating routine of the average consumption power in FIG. 21 is calculated.

$$CPdev=CP-CPave$$

Thereafter, the process goes to Step 4312, wherein it is determined whether or not to execute an attenuation process of the correction value CPcmp of the consumption power depending on whether or not the correction value CPcmp of the consumption power for responding to the change of the future consumption power is zero. As a result, when it is determined that the correction value CPcmp of the consumption power is not zero (during the executing of the attenuation process for the correction value CPcmp of the consumption power), the process goes to Step 4313, wherein it is determined whether or not an absolute value of the consumption power deviation CPdev is greater than a predetermined value. When the absolute value of the consumption power deviation CPdev is less than a predetermined value, it is determined that the attenuation process of the correction value CPcmp of the consumption power is not necessary, the process goes to Step 4316, which will be described later.

On the other hand, when the absolute value of the consumption power deviation CPdev is greater than the predetermined value, the process goes to Step 4314 for continuing to execute the attenuation process of the correction value CPcmp of the consumption power, wherein the consumption power deviation CPdev is tentatively set as the correction value CPcmp of the consumption power by assuming the consumption power deviation CPdev calculated at Step 4301 as the changing amount of the future consumption power. The final average consumption power CPavef calculated according to the above equation (3) by using the correction value CPcmp of the consumption power corresponds to a converging value of the future average consumption power.

Thereafter, the process goes to Step 4315, wherein the consumption power deviation CPdev is divided by the total sample number NFC total (sampling time) in the present sample period to determine a correction attenuation value CPcmpdev [i] of this time's consumption power.

$$CPcmpdev[i]=CPdev/NFC\ total$$

Accordingly, as the total sample number NFC total (sampling time) in the present sample period is increased, the correction attenuation value CPcmpdev of the consumption power (correction amount to the correction value CPcmp of the consumption power) is reduced.

Thereafter, the process goes to Step 4316, wherein the correction attenuation value CPcmpdev [i] of this time's consumption power is reduced from the correction value CPcmp [i−1] of the previous consumption power to determine a correction value CPcmp [i] of this time's consumption power.

$$CPcmp[i]=CPcmp[i-1]-CPcmpdev[i]$$

Further, at next Step 4317, it is determined whether or not an absolute value of the correction value CPcmp [i] of this time's consumption power is smaller than a predetermined value. When the absolute value of the correction value Cpcmp [i] of this time's consumption power is more than the predetermined value, the correction value CPcmp [i] of this time's consumption power calculated at Step 4316 is used as a final correction value CPcmp [i] of the consumption power without any change. When the absolute value of the correction value CPcmp [i] of this time's consumption power is, however, smaller than the predetermined value, the process goes to Step 4318, wherein the correction value CPcmp [i] of the consumption power is reset as zero.

CPcmp[i]=zero

The correction value CPcmp of the consumption power determined at Step 4316 or Step 4318 is used to calculate a final average consumption power CPavef by the calculating routine for the average consumption power in FIG. 21

The calculating routine for the target electric consumption is executed based upon a flow chart in FIG. 6. The calculating routine for the correction amount of the target electric consumption is executed based upon a flow chart in FIG. 8. The determining routine for the power generation execution is executed based upon a flow chart in FIG. 9.

Figure 23:
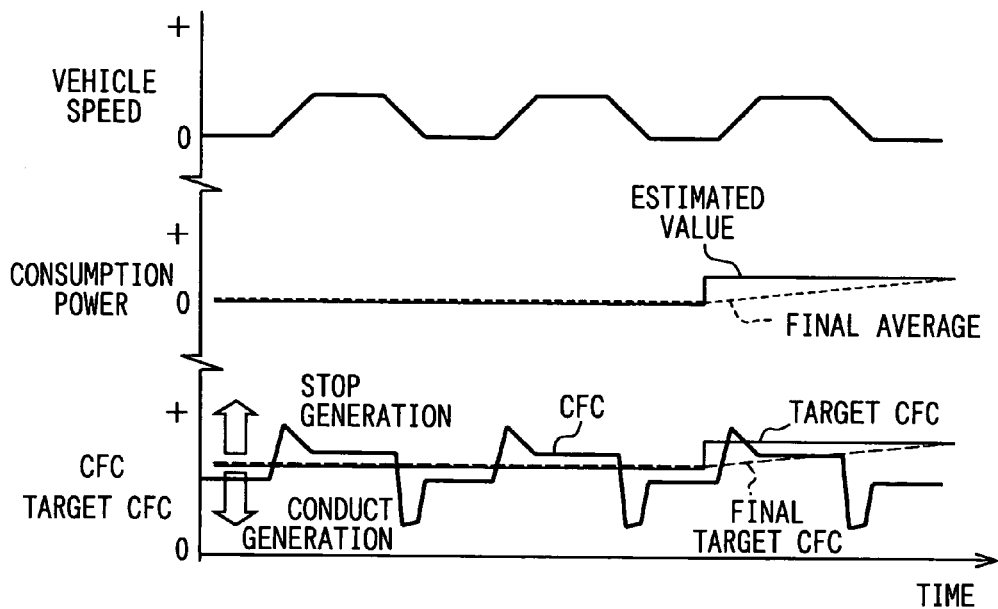
FIG. 23 is a time chart for explaining a control example in the sixth embodiment.

A control example of the sixth embodiment as described above will be explained with reference to FIG. 23. The deviation between the present consumption power and the average consumption power in the past travel history is assumed as the changing amount of the future consumption power to determine the estimated converging value of the future average consumption power, thereby controlling a final average consumption power used for calculating the target electric consumption to gradually converge on the estimated converging value of the future average consumption power. Thereby, a final target electric consumption used for power generation control is gradually converged on the converging value of the future target electric consumption. Accordingly, even under the condition where the consumption power changes in the future, the change of the future consumption power is estimated and thereby the final target electric consumption can be changed in such a way as to quickly balance the future charging amount with the discharging amount of the battery 12. Therefore, even under the condition where the consumption power relatively largely changes, the change of the consumption power is followed up in good response, enabling an improvement on both charging/discharging balance and fuel consumption reduction.

In the sixth embodiment, the target electric consumption is set based upon the use-frequency of the electric consumption, the possible power generation amount and the average consumption power. However, the target electric consumption may be set based only upon the use-frequency of the electric consumption, or based upon the possible power generation amount and the average consumption power.

Seventh Embodiment

In the above sixth embodiment, the deviation between the present consumption power and the average consumption power in the past travel history is assumed as the changing amount of the future consumption power to estimate the converging value of the future average consumption power. In a seventh embodiment of the present invention shown in FIGS. 24 to 27, however, a change in a use state of the future electric load is estimated, thereby estimating a changing amount of the future consumption power caused by the change in the use state of the future electric load. A converging value of the future average consumption power is estimated based upon the average consumption power in the past travel history and the estimated changing amount of the future consumption power. Hereinafter, the process content of each routine in FIGS. 24 to 27 for executing this control will be explained. The processes other than this are the same as in the above sixth embodiment.

[Calculating Routine for Average Consumption Power]

Figure 24:
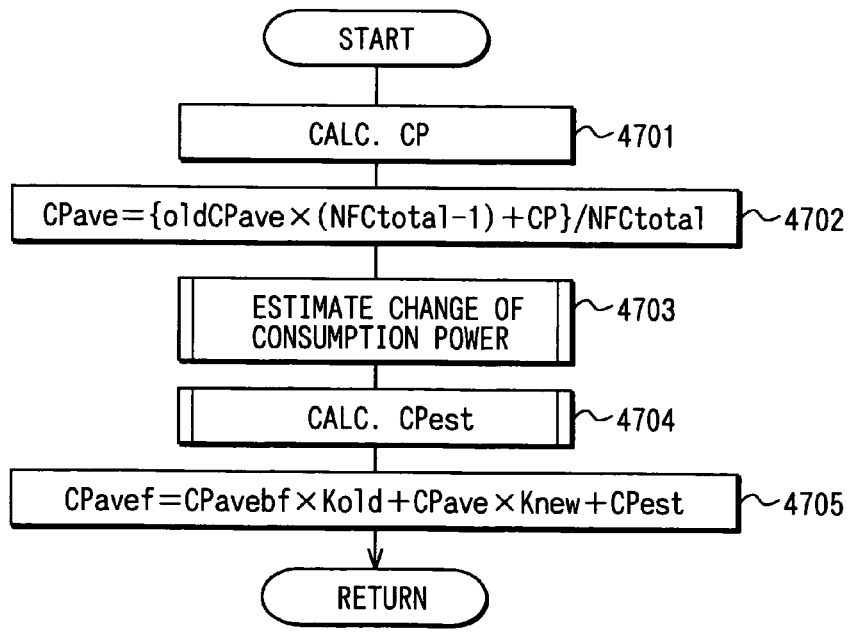
FIG. 24 is a flow chart showing a flow of the process in the calculating routine for average consumption power in a seventh embodiment of the present invention.

A calculating routine of average consumption power in FIG. 24 is executed in a predetermined cycle (for example, 8 ms cycle) during engine operating. When this routine is activated, first at Step 4701, consumption power CP per calculation cycle consumed in a vehicle is calculated. Thereafter, the process goes to Step 4702, wherein this time's average consumption power CPave in the present sample period is calculated according to the following equation from the previous average consumption power old CPave in the present sample period, the total sample number NFC total and this time's consumption power CP.

CPave={old CPave×(NFC total−1)+CP}/NFC total.

Thereafter, the process goes to Step 4703, wherein an estimating routine for a change of the consumption power in FIG. 25 to be described later is executed to estimate a target value CPesttg of consumption power correction caused by a future change of the use state of the electric load such as a headlight (estimated change amount of the future consumption power).

Thereafter, the process goes to Step 4704, wherein a calculating routine for a consumption power correction value in FIG. 26 to be described later is executed to estimate a change of the future consumption power, thus calculating a consumption power correction value CPest (estimated change amount of the future consumption power) for changing a target electric consumption TCFCf in a feed forward way.

Thereafter, the process goes to Step 4705, wherein a final average consumption power CPavef in the present sample period is calculated according to the following equation from this time's average consumption power CPave calculated at Step 4702, the final value CPavebf of the average consumption power in the previous sample period stored in the memory of the control device 11, the correction coefficients K new and K old to the present and past data and the correction value CPest of the consumption power for responding to the change of the future consumption power.

CPavef=CPavebf×*K* old+CPave×*K* new+CPest

The above equation shows that a weighted average value between this time's average consumption power CPave in the present sample period and the final value CPavebf of the average consumption power in the previous sample period is calculated by using the correction coefficients K new and K old to the present and past data as a weighting factor, and the final average consumption power CPavef in the present sample period is set by adding the correction value CPest of the consumption power for responding to the change of the future consumption power to the weighted average value. The weighting factor (K new or K old) is set in accordance with the total sample number NFC total of the present sample period.

[Estimating Routine for Change of Consumption Power]

Figure 25:
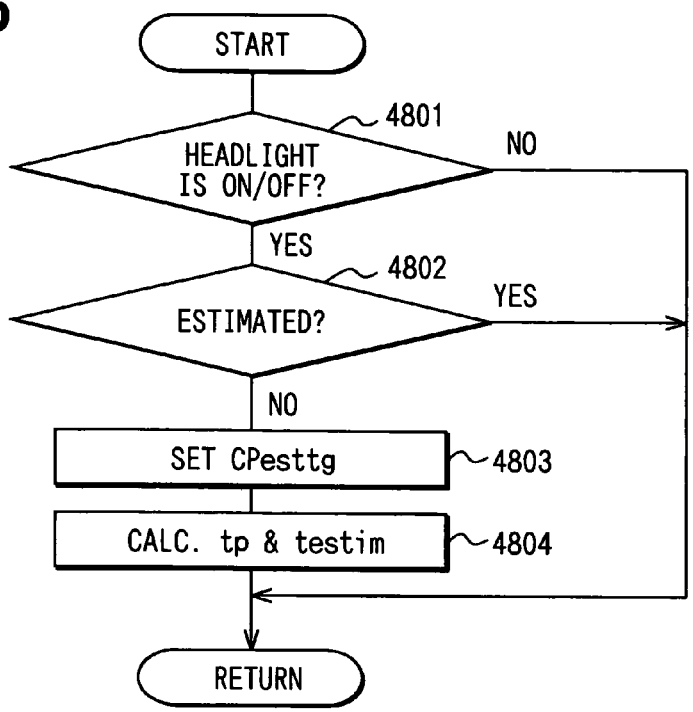
FIG. 25 is a flow chart showing a flow of the process in the estimating routine for a change of consumption power in the seventh embodiment.
Figure 27:
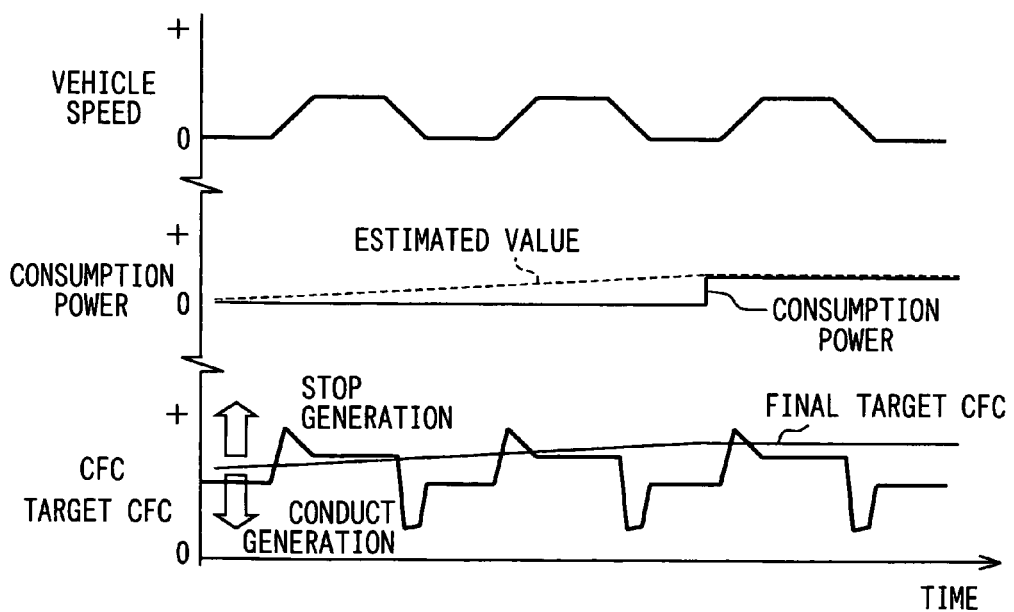
FIG. 27 is a time chart for explaining a control example in the seventh embodiment.

An estimating routine for a change of the consumption power in FIG. 25 is a subroutine executed at Step 4703 of the calculating routine of the average consumption power in FIG. 24. When this routine is activated, first at Step 4801, whether or not there is the possibility of switching ON/OFF of a head light during this time's operating period is estimated based-upon the present time, for example. Alternatively, this switching possibility may be estimated based upon the present time and destination information of the navigation system. In addition, ON/OFF of an electric load other than the head light, for example, ON/OFF of an air-conditioner may be estimated based upon a temperature change or the like.

When it is estimated at Step 4801 that there is no possibility of switching ON/OFF of the headlight during this time's operating period, this routine ends. On the other hand, when it is estimated that there is the possibility of switching ON/OFF of the head light during this time's operating period, the process goes to Step 4802, wherein it is determined whether or not it is already estimated until the previous time that there is the possibility of switching ON/OFF of the head light during this time's operating period. When it is not estimated until the previous time that there is the possibility of switching ON/OFF of the head light during this time's operating period (that is, it is first estimated this time that there is the possibility of switching ON/OFF of the head light during this time's operating period), the process goes to Step 4803, wherein the target value CPesttg of the consumption power correction is set to a power value in accordance with ON/OFF of the head light. Then, the process goes to Step 4804, wherein an estimating time testim for switching turn-on/turn-off of the head light from the present time tp, date information of the navigation system or the like is calculated, and this routine ends.

[Calculating Routine for Correction Value of Consumption Power]

Figure 26:
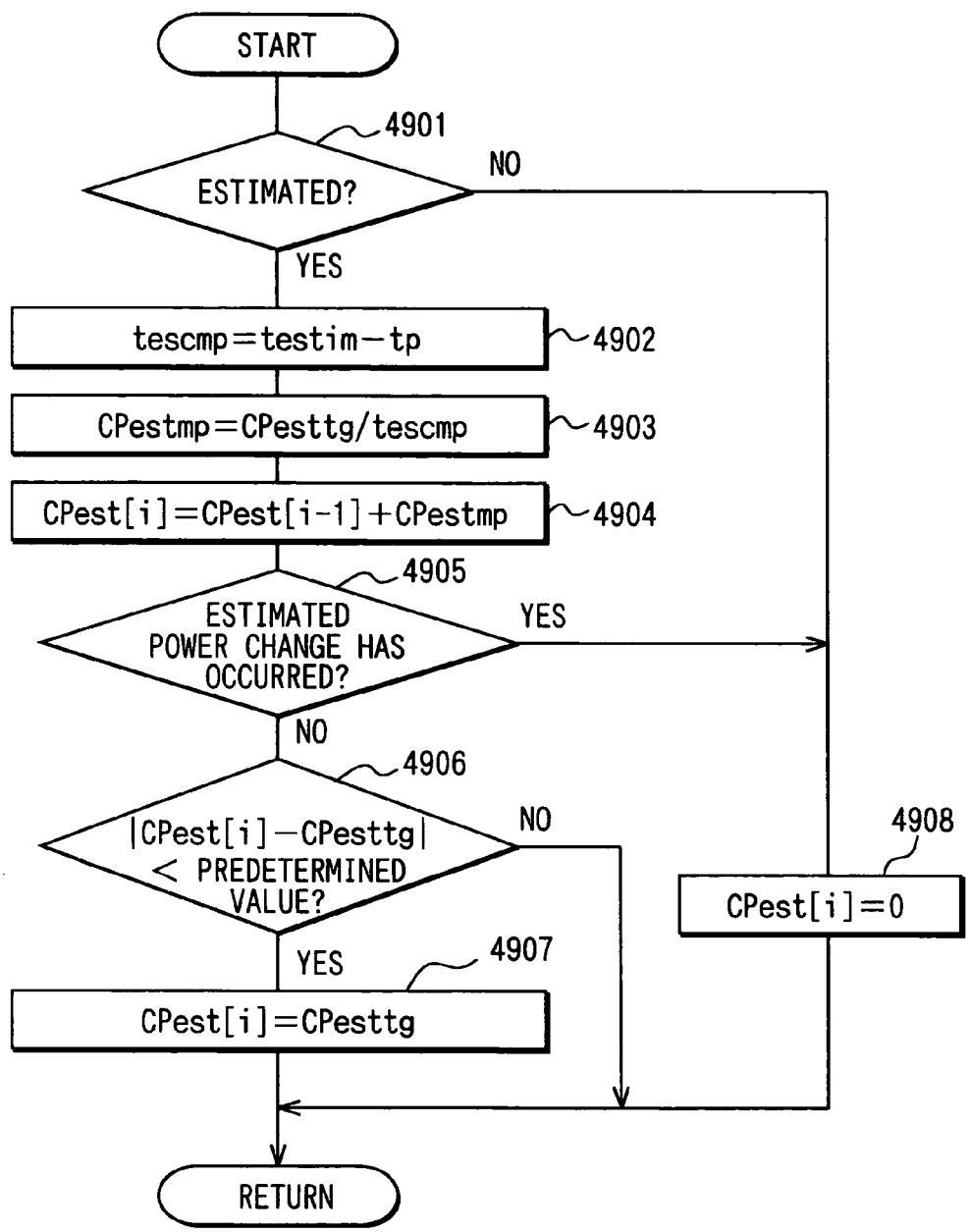
FIG. 26 is a flow chart showing a flow of the process in the calculating routine for a correction amount of consumption power in the seventh embodiment.

An estimating routine for a change of the consumption power in FIG. 26 is a subroutine executed at Step 4704 of the calculating routine of the average consumption power in FIG. 24. When this routine is activated, first at Step 4901, it is determined whether or not it is already estimated that there is the possibility of switching ON/OFF of a headlight. When it is not estimated that there is the possibility of switching ON/OFF of the headlight, the process goes to Step 4908, wherein the correction value CPest [i] of this time's consumption power is set as zero.

In contrast to this, when it is estimated that there is the possibility of switching ON/OFF of the head light, the process goes to Step 4902, wherein time (estimated correction time) tescmp from the present time tp to the estimated time testim for switching ON/OFF of the head light is calculated.

*tescmp=testim−tp*

Thereafter, the process goes to Step 4903, wherein the correction target value CPesttg of the consumption power calculated at the estimating routine for the change of the consumption power in FIG. 13 is divided by the estimated correction time tescmp to determine a gradual increase value of an estimated correction amount.

*CPestmp=CPesttg/tescmp*

Thereafter, the process goes to Step 4904, wherein the gradual increase value of the estimated correction amount CPestmp is added to the previous correction value CPest [i−1] of the consumption power to determine this time's correction value CPest [i] of the consumption power.

*CPest[i]=CPest[i−1]+CPestmp*

Thereafter, the process goes to Step 4905, wherein it is determined whether or not the estimated power change has already occured. When the estimated power change already occurs, the process goes to Step 4908, wherein this time's correction value CPest [i] of the consumption power is set as zero.

In contrast to this, when the estimated power change does not occur yet, the process goes to Step 4906, wherein an absolute value of a deviation between this time's correction value CPest [i] of the consumption power and the correction target value CPesttg of the consumption power is compared with a predetermined value. When the absolute value of the deviation between this time's correction value CPest [i] of the consumption power and the correction target value CPesttg of the consumption power is smaller than the predetermined value, the process goes to Step 4907, wherein this time's correction value CPest [i] of the consumption power is set as the correction target value CPesttg of the consumption power. On the other hand, when the absolute value of the deviation between this time's correction value CPest [i] of the consumption power and the correction target value CPesttg of the consumption power is more than the predetermined value, this time's correction value CPest [i] of the consumption power calculated at Step 4904 is used as it is. In this process, as the time tescmp (estimated correction time) from the present time tp to the estimated time for switching ON/OFF of the head light is shortened, the correction value CPest of the consumption power is forced to be gradually closer to the correction target value CPesttg of the consumption power and finally converged on the correction target value CPesttg of the consumption power.

A control example of the seventh embodiment as described above will be explained with reference to FIG. 27.

The future switch for ON/OFF of the head light (a change of a use state of the electric load) is estimated to estimate the changing amount of the future consumption power (consumption power correction value CPest) caused by the future switch for ON/OFF of the head light, determining a converging value of the future average consumption power in addition of the estimated changing amount of the future consumption power to the average consumption power in the past travel history. In addition, for a period from the estimated timing to a point when a change of the consumption power actually occurs, a final average consumption power used for calculating the target electric consumption is controlled to gradually converge on the estimated converging value of the future average consumption power. As a result, even under the condition where the consumption power changes in the future, the change of the future consumption power is estimated and thereby the final target electric consumption can be changed in such a way as to quickly balance the future charging amount with the future discharging amount of the battery 12. Therefore, even under the condition where the consumption power relatively largely changes, the change of the consumption power is followed up in good response, enabling an improvement on both charging/discharging balance and fuel consumption reduction.

In the seventh embodiment, for a period from the timing when the change of the future consumption power is estimated to a point when the change of the consumption power actually occurs, the average consumption power is corrected to gradually converge on the estimated converging value of the average consumption power. However, a certain correction value may be added to the average consumption power in accordance with the estimated converging value of the average consumption power and the time until the change of the consumption power occurs.

In addition, for a period from the timing when the change of the future consumption power is estimated to a point when the change of the consumption power actually occurs, a final target SOC may be calculated from the estimated converging value of the average consumption power to make a target SOC be gradually closer to the final target SOC.

In the above sixth and seventh embodiments, the estimated converging value of the future average consumption power is used as information of the consumption power to calculate the target electric consumption. However, the target electric consumption is calculated based upon the use-frequency of the electric consumption and information of the consumption power in the past travel history, and thereafter, the estimated converging value of the future average consumption power estimated by the future consumption power estimating means may be used to correct the target electric consumption.

Eighth Embodiment

In the eighth embodiment, use-frequency of the electric consumption, a electric consumption average value, a possible power generation amount average value and an average consumption power for each class are calculated in a predetermined calculation cycle (for example, 8 ms cycle) during engine operating to calculate the target electric consumption based upon these data in such a way that the balance between the charge and the discharge of the battery 12 becomes zero (balance the charging amount with the discharging amount). Further, the target electric consumption is feedback-corrected by PI control in such a way as to reduce a deviation between the present remaining charging amount and the target remaining charging amount of the battery 12. It is determined whether or not to execute power generation of the alternator 16 by comparing the present electric consumption with the corrected target electric consumption (final target electric consumption).

Further, in the eighth embodiment, each time when the sample number of data for calculating the target electric consumption comes to a predetermined number NFC lmt in advance set (each time one detection cycle period ends), the sample number is initialized and also a final value of the data is stored in a RAM of the control device 11, the data in this time's sample period is corrected by using the final value of the data in the previous sample period stored in the RAM, in accordance with the sample number of this time's sample period started after the final value of the data is stored to calculate the target electric consumption based upon the corrected data. In this way, even when the sample number in this time's sample period is small, the final value of the data in the previous sample period is appropriately reflected in the data in this time's sample period, maintaining continuity and reliability of the target electric consumption.

However, when the sample period of data such as the use-frequency of the electric consumption at this time's traveling used for calculating the target electric consumption is short, the sample number of the data at this time's traveling is small, leading to deterioration of accuracy of the data such as the use-frequency of the electric consumption. As a result, since accuracy of the target electric consumption calculated based upon this data is also to be deteriorated, producing the possibility of lowering the fuel saving effect or deteriorating the balance between the charge and the discharge of the battery 12.

For the solution to the above, until the sample period of the data at this time's traveling exceeds a predetermined period, the final target electric consumption at the previous traveling stored in the rewritable nonvolatile memory (memory means) such as the backup RAM of the control device 11 and the target electric consumption calculated at this time's traveling are used to determine the final target electric consumption. In this way, for the period when the sample period of the data at this time's traveling is short and when accuracy of the target electric consumption calculated at this time's traveling is poor, the final target electric consumption with good accuracy at the previous traveling stored in the nonvolatile memory and the target electric consumption calculated at this time's traveling both are used to determine the final target electric consumption. Accordingly, even if the sample period of the data at this time's traveling is short, it is possible to secure accuracy of the final target electric consumption used for the actual power generation, leading to an improvement in both a fuel saving effect and a balance between charge and discharge.

The calculating routine of the electric consumption is executed based upon a flow chart shown in FIG. 3, the accumulating routine for the electric consumption class data is executed based upon a flow chart in FIGS. 12 and 13, the calculating routine for the average consumption power is executed based upon a flow chart in FIG. 14, the calculating routine for the target electric consumption is executed based upon a flow chart in FIG. 6 and the calculating routine for the correction amount of the target electric consumption is executed based upon a flow chart in FIG. 8.

[Calculating Routine for Final Target Electric Consumption]

Figure 28:
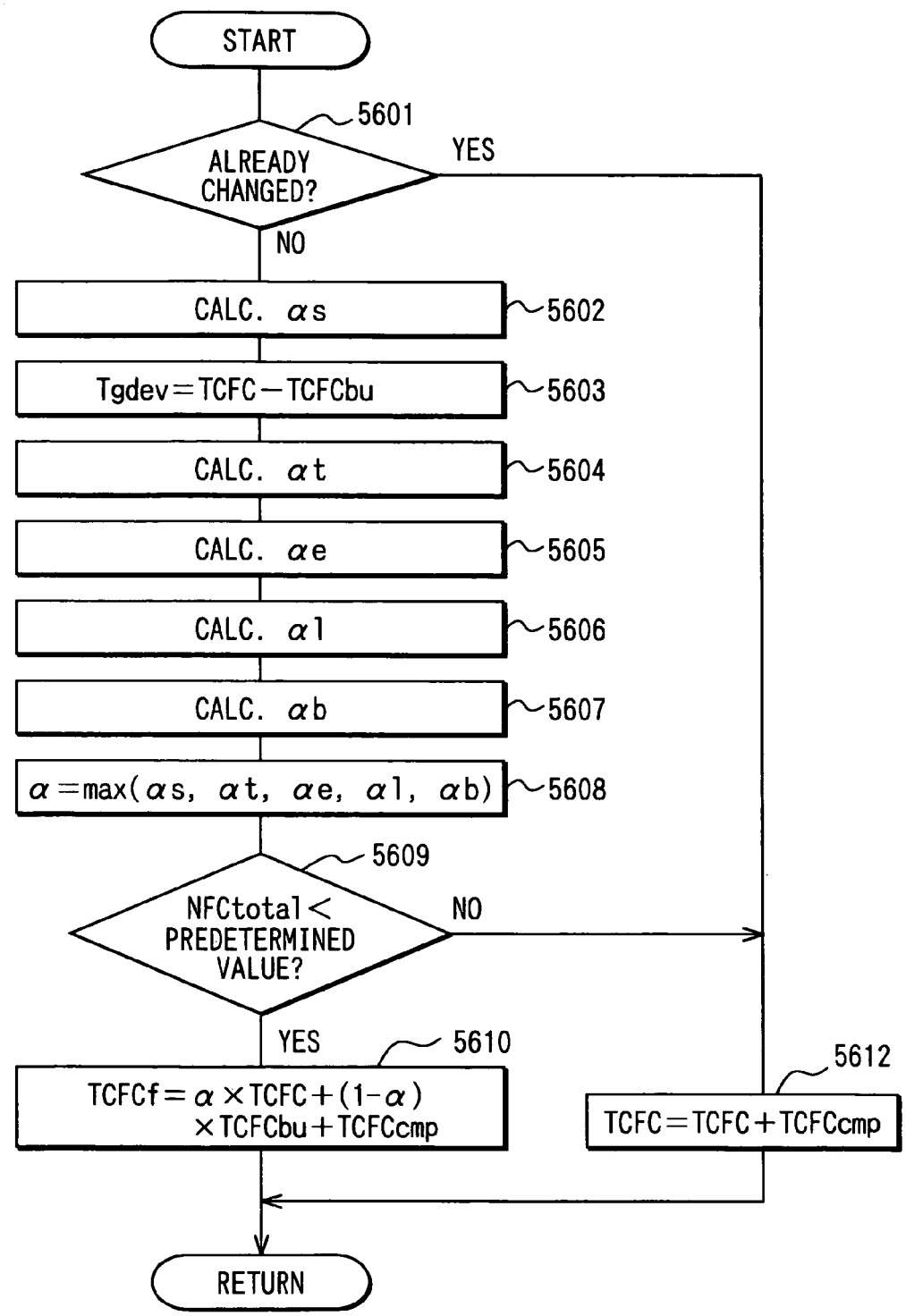
FIG. 28 is a flow chart showing a flow of the process in the calculating routine for final target electric consumption in an eighth embodiment of the present invention.

A calculating routine of final target electric consumption in FIG. 28 is executed in a predetermined cycle (for example, 8 ms cycle) during engine operating. When this routine is activated, first at Step 5601, it is determined whether or not the process is already changed only from the target electric consumption TCFC calculated at this time's traveling into the process of calculating the final target electric consumption TCFCf. When it is determined that it has already changed, the process goes to Step 5612, wherein the correction amount TCFCcmp of the target electric consumption calculated at the calculating routine for the correction amount of the target electric consumption in FIG. 8 is added to the target electric consumption TCFC at this time's traveling calculated at the calculating routine for the target electric consumption in FIG. 7. Thereby, the final target electric consumption TCFCf is determined by correcting the target electric consumption TCFC with the correction amount TCFCcmp of the target electric consumption.

$$TCFCf=TCFC+TCFCcmp$$

In contrast to this, at Step 5601, when it is determined that the process is not changed yet only from the target electric consumption TCFC calculated at this time's traveling into the process of calculating the final target electric consumption TCFCf, by the processes subsequent to Step 5602, the final target electric consumption TCFCbu at the previous traveling stored in the nonvolatile memory (memory means) of the control device 11 and the target electric consumption TCFC calculated at this time's traveling are used to calculate the final target electric consumption TCFCf by the weighted average as follows.

First at Step 5602, a weighting factor $\alpha s$ determining a use rate of the target electric consumption TCFC at this time's traveling for calculating the final target electric consumption TCFCf with a weighted average is calculated by a calculating map of the weighting factor $\alpha s$ in FIG. 13 in accordance with the sample period at this time's traveling. The calculating map of the weighting factor as in FIG. 13 is set in such a way that at this time's travel start (sample period=zero), the weighting factor $\alpha s$ (use rate of the target electric consumption at this time's traveling) becomes the minimum value "0", and as the sample period is longer, the weighting factor as is gradually larger and at a point when the sample period reaches a predetermined period, the weighting factor αs becomes the maximum value "1".

Thereafter, the process goes to Step 5603, wherein a deviation Tgdev between the target electric consumption TCFC calculated at this time's traveling and the final target electric consumption TCFCbu at the previous traveling stored in the nonvolatile memory is calculated.

$$Tgdev=TCFC-TCFCbu$$

At next Step 5604, a weighting factor αt in accordance with the target electric consumption deviation Tgdev calculated at Step 5603 is calculated by a calculating map for the weighting factor αt in FIG. 32. The calculating map of the weighting factor αt in FIG. 32 is set in such a way that when the target electric consumption deviation Tgdev is zero, the weighting factor αt becomes the minimum value "0", and as an absolute value of the target electric consumption deviation Tgdev becomes larger, the weighting factor αt is gradually larger and when the absolute value of the target electric consumption deviation Tgdev is more than a predetermined value (for example, 0.03), the weighting factor αt becomes the maximum value "1".

Figures 33, 34, 35:
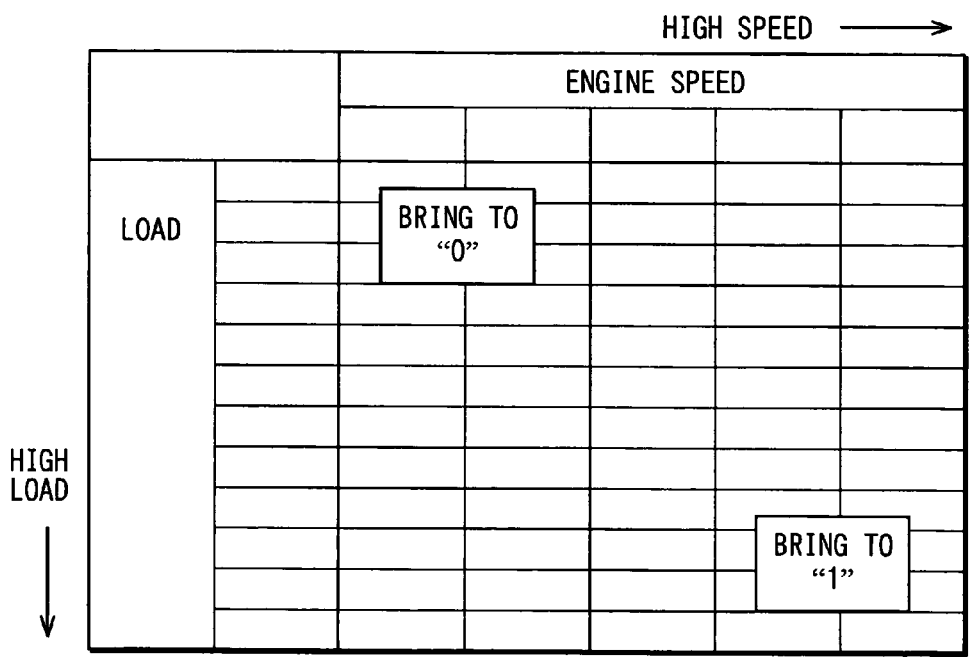
FIG. 33 is a table showing one example of a map for calculating a weighting factor in accordance with a final average consumption power during this time's traveling in the eighth embodiment.
FIG. 34 is a table showing one example of a map for calculating a weighting factor in accordance with an operating condition in the eighth embodiment.
FIG. 35 is a table showing one example of a map for calculating a weighting factor in accordance with a battery remaining charging amount in the eighth embodiment.

Thereafter, the process goes to Step 5605, wherein a weighting factor αe in accordance with a final target consumption power CPavef at this time's traveling calculated at the calculating routine of the average consumption power in FIG. 14 is calculated by a calculating map for the weighting factor αe in FIG. 33. The calculating map of the weighting factor αe in FIG. 33 is set in such a way that when the average consumption power CPavef is less than a predetermined lower limit value (for example, 200 W), the weighting factor αe becomes the minimum value "0", and as the average consumption power CPavef becomes larger, the weighting factor αe is gradually larger and when the average consumption power CPavef is more than a predetermined upper limit value (for example, 400 W), the weighting factor αe becomes the maximum value "1".

Thereafter, the process goes to Step 5606, a weighting factor αl in accordance with engine conditions (for example, engine rotational speeds and loads) is calculated by a calculating map for the weighting factor αl in FIG. 34. The calculating map of the weighting factor αl in FIG. 34 is set in such a way that at a lower rotational speed and a lower load, the weighting factor αl becomes smaller, and at a higher rotational speed and a higher load, the weighting factor αl becomes larger.

At next Step 5607, a weighting factor αb in accordance with a remaining charging amount SOC of the battery 12 is calculated by a calculating map for the weighting factor αb in FIG. 35. The calculating map of the weighting factor αb in FIG. 35 is set in such a way that when the remaining charging amount SOC of the battery 12 corresponds to a target SOC (for example, 90%), the weighting factor αb becomes the minimum value "0", and as the remaining charging amount SOC deviates form the target SOC, the weighting factor αb is gradually larger.

Thereafter, the process goes to Step 5608, wherein the maximum weighting factor out of five weighting factors αs, αt, αe, αl, and αb calculated by the processes at Steps 5602 to 5607 respectively is selected as a final weighting factor α. Alternatively, the second largest weighting factor out of five weighting factors αs, αt, αe, αl, and αb may be selected as a final weighting factor α or an average value of five weighting factors αs, αt, αe, αl, and αb may be selected as a final weighting factor α.

Thereafter, the process goes to Step 5609, wherein whether or not the sample period at this time's traveling (a period from this time's travel start to the present period) exceeds a predetermined period prescribed is determined depending on whether or not the total sample number NFC total at this time's traveling exceeds a predetermined number. The predetermined period (predetermined number) is set as a period required for securing accuracy of data such as use-frequency of the electric consumption used for calculating the target electric consumption at this time's traveling.

At Step 5609, when it is determined that the sample period at this time's traveling does not exceed the predetermined period (the total sample number NFC total at this time's traveling is less than a predetermined number), it is determined that accuracy for calculating the target electric consumption TCFC at this time's traveling is not secured. Then, the process goes to Step 5610, wherein the final weighting factor, determined at Step 5608 is used to calculate a weighted average value between the target electric consumption TCFC calculated at this time's traveling and the final target electric consumption TCFCbu at the previous traveling stored in the non-volatile memory (memory means) of the control device 11. This weighted average value is corrected with the target electric consumption correction amount TCFCcmp to determine a final target electric consumption TCFCf.

$$TCFCf=\alpha \times TCFC+(1-\alpha)\times TCFCbu+TCFCcmp$$

On the other hand, at Step 5609, when it is determined that the sample period at this time's traveling exceeds the predetermined period (the total sample number NFC total at this time's traveling exceeds the predetermined number), it is determined that the accuracy for calculating the target electric consumption TCFC at this time's traveling is secured. Then, the process goes to Step 5612, wherein the target electric consumption TCFC calculated at this time's traveling is corrected with the target electric consumption correction amount TCFCcmp to determine a final target electric consumption TCFCf.

$$TCFCf=TCFC+TCFCcmp$$

Accordingly, when the sample period at this time's traveling exceeds the predetermined period, only the target electric consumption TCFC calculated at this time's traveling is used without use of the final target electric consumption TCFCbu at the previous traveling stored in the non-volatile memory of the control device 11 to determine a final target electric consumption TCFCf.

[Initial Process Routine]

An initial process routine in FIG. 29 is activated at an ON-operation of a key switch 13 (at power switch-ON of the control device 11). When this routine is activated, a backup value TCFCbub of the final target electric consumption at the previous traveling stored in the non-volatile memory of the control device 11 is read in and is stored in the RAM as the final target electric consumption TCFCbu at the previous traveling (Step 5701).

$$TCFCbu=TCFCbub$$

At Step 5610 of the calculating routine for the final target electric consumption in FIG. 28, the final target electric consumption TCFCbu at the previous traveling is used to calculate the final target electric consumption TCFCf.

[Backup Routine for Final Target Electric Consumption]

A backup routine for a final target electric consumption in FIG. 30 is executed in a predetermined cycle (for example, 8 ms cycle) during engine operating. Each time the final target electric consumption TCFCf is calculated at the calculating routine for the final target electric consumption in FIG. 28, the final target electric consumption TCFCf is updated and stored as a backup value TCFCbub of the final target electric consumption at the previous traveling stored in the non-volatile memory of the control device 11 (Step 5702).

TCFCbub=TCFCf

Accordingly, the backup value TCFCbub of the final target electric consumption calculated at a point immediately before the finish of the previous traveling (immediately before OFF of the key switch 13) during engine stopping is stored and held in the nonvolatile memory. At the next travel start (ON-operation of the key switch 13), the backup value TCFCbub is read in by the initial process routine in FIG. 29 and used as the final target electric consumption TCFCbu at the previous traveling.

A determining routine for power generation execution is executed based upon a flow chart in FIG. 7.

In the eighth embodiment as described above, the target electric consumption is set based upon the use-frequency of the electric consumption or the like and the power generation of the alternator 16 is controlled by comparing the electric consumption with the target electric consumption. Therefore, as compared to the conventional power generation control system in which an operating condition for performing power generation is determined by a prescribed map, the power generation control is less affected by accuracy of the map, use environments of a vehicle (a difference in travel road condition, a difference in vehicle speed and a difference in acceleration/deceleration by a driver or the like) or variations in vehicle characteristic. Therefore, the required power generation amount is secured, while certainly reducing an increment of the fuel consumption caused by the power generation, leading to an improvement in both fuel economy and charge/discharge balance.

Further, in the eighth embodiment, until the sample period of the data at this time's traveling (a period from this time's travel start to the present period) exceeds the predetermined period, the target electric consumption calculated at this time's traveling and the final target electric consumption at the previous traveling stored in the nonvolatile memory of the control device 11 are used to determine the final target electric consumption. Therefore, for the period when the sample period of the data at this time's traveling is short and accuracy of the target electric consumption calculated at this time's traveling is poor, the final target electric consumption with good accuracy at the previous traveling stored in the nonvolatile memory and the target electric consumption calculated at this time's traveling both are used to determine the final target electric consumption. Accordingly, even if the sample period of the data at this time's traveling is short, it is possible to secure accuracy of the final target electric consumption used for the actual power generation control, leading to an improvement in both a fuel saving effect and a balance between charge and discharge.

Further, in the eighth embodiment, until the sample period of the data at this time's traveling exceeds the predetermined period, the weighted average value between the target electric consumption calculated at this time's traveling and the final target electric consumption at the previous traveling is used to determine the final target electric consumption. Therefore, the eighth embodiment has an advantage that the final target electric consumption can be accurately calculated by a simple calculating method with a weighted average.

Moreover, the eighth embodiment changes the weighting factor used for processing the weighted average in accordance with the sample period of the data at this time's traveling, the deviation between the target electric consumption at this time's traveling and the final target electric consumption at the previous traveling, the average consumption power, the engine operating condition and the remaining charging amount SOC of the battery 12. Therefore, the eighth embodiment increases/decreases the use rate (weighting factor) of the target electric consumption at this time's traveling in such a way as to achieve both the fuel saving effect and the balance between the charge and discharge of the battery 12, leading to control of improving calculation accuracy of the final target electric consumption.

In addition, the weighting factor may be set based upon at least one of or a combination of at least two of the sample period of the data at this time's traveling, the deviation between the target electric consumption at this time's traveling and the final target electric consumption at the previous traveling, the average consumption power, the engine operating condition and the remaining charging amount SOC of the battery 12. The weighting factor may be set based upon conditions other than the above (for example, battery capacity). Further, the weighting factor may be set as a fixed value obtained by ready adaptation for simple calculating process.

The calculating method for the final target electric consumption is not limited to the weighted average. For example, a two-dimensional map or a mathematical expression may be prepared in advance for calculating the final target electric consumption by setting the final target electric consumption at the previous traveling and the target electric consumption at this time's traveling as parameters to calculate the final target electric consumption with the two-dimensional map or the mathematical expression.

In the eighth embodiment, the target electric consumption is set based upon the use-frequency of the electric consumption, the possible power generation amount and the average consumption power. However, for example, the target electric consumption may be set based only upon the use-frequency of the electric consumption, or based upon the use-frequency of the electric consumption and the possible power generation amount.

Ninth Embodiment

Further, in a ninth embodiment, until the sample period of data at this time's traveling exceeds a predetermined period, only a final target electric consumption at the previous traveling stored in the nonvolatile memory of the control device 11 is used to determine a final target electric consumption at this time's traveling. Hereinafter, the ninth embodiment will be explained in detail with reference to FIGS. 36 to 39.

Figure 36:
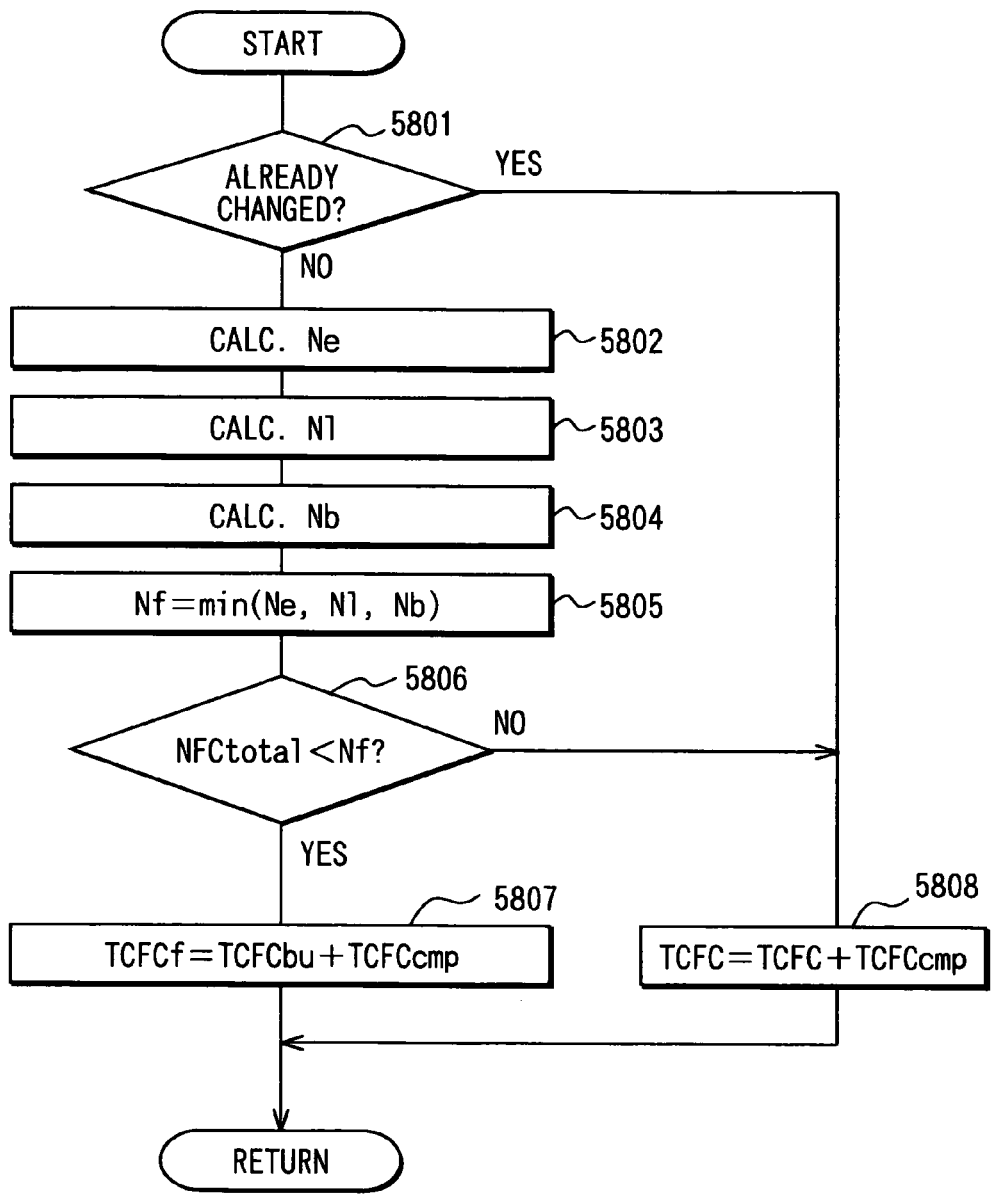
FIG. 36 is a flow chart showing a flow of the process in the calculating routine for final target electric consumption in a ninth embodiment of the present invention.

The ninth embodiment calculates a final target electric consumption TCFCf by a calculating routine for the final target electric consumption in FIG. 36. The other processes are the same as in the eighth embodiment.

The calculating routine for the final target electric consumption in FIG. 36 is executed in a predetermined cycle (for example, 8 ms cycle) during engine operating. When this routine is activated, first at Step 5801, it is determined whether or not the process is already changed only from the target electric consumption TCFC calculated at this time's traveling into the process of calculating the final target electric consumption TCFCf. When it is determined that it is already changed, the process goes to Step 5808, wherein the correction amount TCFCcmp of the target electric consumption calculated at the calculating routine for the correction amount of the target electric consumption in FIG. 8 is added to the target electric consumption TCFC at this time's traveling calculated at the calculating routine for the target electric consumption in FIG. 6. Thereby, the final target electric consumption TCFCf is determined by correcting the target electric consumption TCFC with the correction amount TCFCcmp of the target electric consumption.

TCFCf=TCFC+TCFCcmp

In contrast to this, at Step 5801, when it is determined that the process is not changed yet only from the target electric consumption TCFC calculated at this time's traveling into the process of calculating the final target electric consumption TCFCf, by the processes subsequent to Step 5802, the final electric consumption TCFCbu at the previous travel stored in the nonvolatile memory (memory means) of the control device 11 is used to calculate a final target electric consumption TCFCf at this time's traveling as follows.

Figures 37, 38, 39:
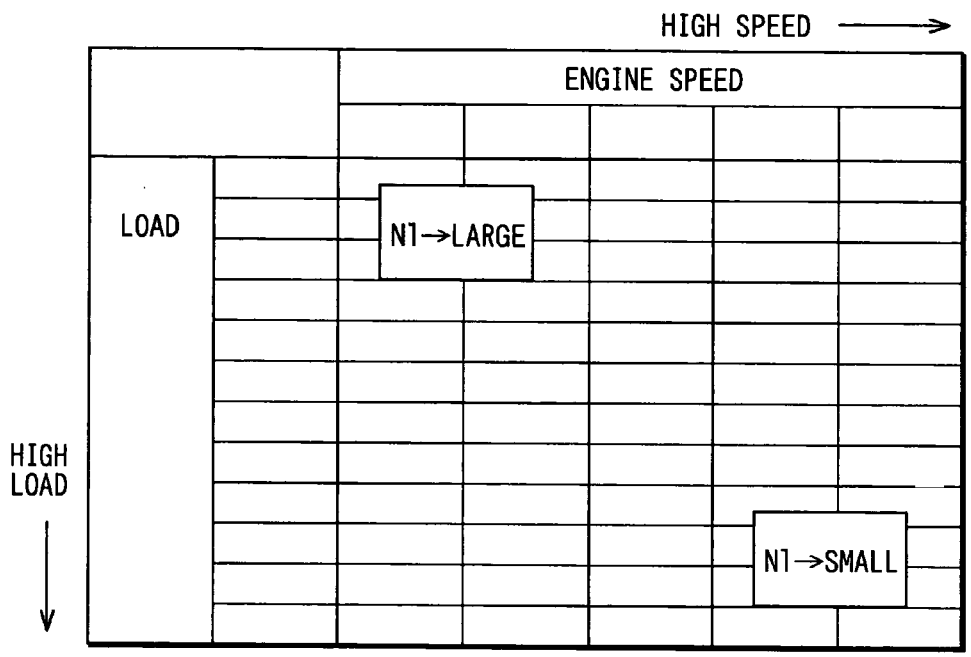
FIG. 37 is a table showing one example of a map for calculating a sample period in accordance with final average consumption power during this time's traveling in the ninth embodiment.
FIG. 38 is a table showing one example of a map for calculating a sample period in accordance with an operating condition in the eighth embodiment.
FIG. 39 is a table showing one example of a map for calculating a sample period in accordance with a battery remaining charging amount in the ninth embodiment.

First at Step 5802, a sample period Ne for calculating the final target electric consumption TCFCf at this time's traveling by using the final electric consumption TCFCbu at the previous travel is calculated with a calculating map for the sample period Ne in FIG. 37 in accordance with a final average consumption power CPavef at this time's traveling calculated by the calculating routine for the average consumption power in FIG. 14. The calculating map for the sample period Ne in FIG. 37 is set in such a way that, as the average consumption power CPavef increases, the sample period Ne is shortened. In the map in FIG. 37, the sample period Ne is set with the sample number, but may be set with time.

Thereafter, the process goes to Step 5803, a sample period NI in accordance with operating conditions (for example, engine rotational speeds and loads) is calculated by a calculating map for the sample period NI in FIG. 38. The calculating map of the sample period NI in FIG. 38 is set in such a way that at a lower rotational speed and a lower load, the sample period NI becomes larger, and at a higher rotational speed and a higher load, the sample period NI becomes smaller.

At next Step 5804, a sample period Nb in accordance with a remaining charging amount SOC of the battery 12 is calculated by a calculating map for the sample period Nb in FIG. 39. The calculating map of the sample period Nb in FIG. 39 is set in such a way that when the remaining charging amount SOC of the battery 12 is closer to a target SOC (for example, 90%), the sample period Nb becomes longer, and as the remaining charging amount SOC deviates form the target SOC, the sample period Nb is gradually shortened.

Thereafter, the process goes to Step 5805, wherein the minimum sample period out of three sample periods Ne, NI and Nb calculated by the processes at Steps 5802 to 5804 respectively is selected as a final sample period Nf. Alternatively, an average value or an intermediate value of three sample periods Ne, NI and Nb may be selected as a final sample period Nf.

Thereafter, the process goes to Step 5806, wherein it is determined whether or not the sample period at this time's traveling (total sample number NFC total from this time's travel start to the present) exceeds the final sample period Nf determined at Step 5805. When it is determined that the total sample number NFC at this time's traveling does not exceed the final sample period Nf, it is determined that calculation accuracy of the target electric consumption TCFC at this time's traveling can not be secured. Then, the process goes to Step 5807, wherein the final target electric consumption TCFCbu at the previous traveling stored in the non-volatile memory of the control device 11 is used as the target electric consumption TCFC at this time's traveling. This target electric consumption is corrected with the target electric consumption correction amount TCFCcmp to determine a final target electric consumption TCFCf.

TCFCf=TCFCbu+TCFCcmp

On the other hand, at Step 5806, when it is determined that the sample period NFC total at this time's traveling exceeds the final sample period. Nf, it is determined that accuracy for calculating the target electric consumption TCFC at this time's traveling is secured. The process goes to Step 5808, wherein the target electric consumption TCFC calculated at this time's traveling is corrected with the target electric consumption correction amount TCFCcmp to determine the final target electric consumption TCFCf.

TCFCf=TCFC+TCFCcmp

Accordingly, when the sample period NFCtotal at this time's traveling exceeds the final sample period Nf, only the target electric consumption TCFC calculated at this time's traveling is used without use of the final target electric consumption TCFCbu at the previous traveling stored in the non-volatile memory of the control device 11 to determine the final target electric consumption TCFCf.

Further, in the ninth embodiment, until the sample period of the data at this time's traveling (the total sample number NFC total from this time's travel start to the present period) exceeds the final sample period Nf, the final target electric consumption TCFCbu at the previous traveling stored in the nonvolatile memory of the control device 11 is used as the target electric consumption at this time's traveling to determine the final target electric consumption TCFCf. Therefore, until accuracy of the target electric consumption calculated based upon data at this time's traveling is secured, the control that the final target electric consumption at the previous traveling stored in the nonvolatile memory is used as the target electric consumption at this time's traveling is possible. Accordingly, even if the sample period of the data at this time's traveling is short, it is possible to secure accuracy of the final target electric consumption used for the actual power generation control.

In addition, the final sample period Nf is set based upon the average consumption power, the engine operating condition and the remaining charging amount of the battery 12 at this time's traveling. Therefore, the ninth embodiment increases/decreases the final sample period Nf in such a way as to achieve both the fuel saving effect and the balance between the charge and discharge, leading to control of improving calculation accuracy of the final target electric consumption.

In addition, the final sample period Nf may be set based upon one of or a combination of at least two of the average consumption power, the engine operating condition and the remaining charging amount SOC of the battery 12 at this time's traveling. The final sample period Nf may be set based upon conditions other than the above (for example, a deviation between the target electric consumption at this time's traveling and the final target electric consumption at the previous traveling, or the battery capacity). Further, the final sample period Nf may be set as a fixed value obtained by ready adaptation for simple calculating process.

Tenth Embodiment

A tenth embodiment performs in parallel a process of calculating a target electric consumption (first target electric consumption) used for power generation control based upon data of a normal sample period (first sample period) and a process of calculating a target electric consumption (second target electric consumption) used for estimating a change of an operating condition based upon a sample period (second sample period) shorter than the normal sample period. Further, the tenth embodiment estimates a change of a future operating condition based upon a deviation between the two target electric consumptions and also initializes data in the normal sample period (the first sample period) when the change of the future electric consumption is estimated, thereby correcting the target electric consumption (the first target electric consumption) used for power generation control. Thereby, the target electric consumption can be corrected in a feed forward way with good response by following up the change of the future operating condition.

The electric consumption calculating routine is executed based upon a flow chart in FIG. 3.

[Accumulating Routine for Electric Consumption Class Data]

An accumulating routine of electric consumption class data is executed in a predetermined cycle (for example, 8 ms cycle) during engine operating. Thereby, the electric consumption CFC calculated in the predetermined cycle by the calculating routine for the electric consumption in FIG. 3 is statistically processed to calculate use-frequency of the electric consumption CFC for each class, and also an average value of the electric consumption and an average value of the possible power generation amount. Theses data are accumulated in the memory of the control device 11.

When the this routine is activated, first at Step 6200, a possible power generation amount GP in accordance with the present engine rotational speed is calculated from the map showing the relation between engine rotational speeds and power generation characteristics of the alternator 16. Then, the process goes to Step 6201, wherein a count value of the present total sample NFC total number counts up.

Thereafter, the process goes to Step 6202, wherein it is determined by an estimating routine for a change of an operating condition in FIG. 41 to be explained later whether or not a request for initialization is made (whether or not the change of the future operating condition is estimated). When it is determined that the request for initialization is not made, the process goes to Step 6203, wherein it is determined whether or not the present total sample number NFC total exceeds a predetermined value NFC Imt which is equivalent to the total sample number of the one entire sample period. When the present total sample number NFC total does not exceed the predetermined number NFC Imt, it is determined that the process is in the halfway of the sample period and the process goes to Step 6206, wherein correction coefficients K new and K old to the present and past data are calculated by using the present total sample number NFC total and the predetermined number NFC Imt.

$$K\text{ new}=NFC\text{ total}/NFC\text{ Imt} \quad (4)$$

$$K\text{ old}=1-K\text{ new} \quad (5)$$

In contrast to this, when it is determined at Step 6203 that the present total sample number NFC total exceeds the predetermined number NFC Imt, it is determined that the routine comes to termination timing of one sample period and the process goes to Step 6204a, wherein the counter of the total sample number NFC total is reset to return the total sample number NFC total to an initial value "1". Then, at Step 6205a, data of the electric consumption average value CFCave (A) to CFCave (Z), the possible power generation amount average value GPave (A) to GPave (Z), the use-frequency R (A) to R (Z) for each class calculated by executing the previous routine and data of the average consumption power calculated at the calculating routine for the average consumption power in FIG. 14 are stored in the memory of the control device 11 as the final value CFCavebf (A) to CFCavebf (Z), GPavebf (A) to GPavebf (Z), R bf (A) to R bf (Z) and CPavebf of each data of the previous sample period.

[Memory of the Final Value of the Electric Consumption Average Value CFCave of Each Class A to Z]

$CFCavebf(A)=CFCave(A)$ $CFCavebf(B)=CFCave(B)$

. . .

$CFCavebf(Z)=CFCave(Z)$

[Memory of the Final Value of the Possible Power Generation Amount Average Value GPave of Each Class A to Z]

$GPavebf(A)=GPave(A)$ $GPavebf(B)=GPave(B)$

. . .

$GPavebf(Z)=GPave(Z)$

[Memory of the Final Value of the Use-Frequency R of Each Class A to Z]

$Rbf(A)=R(A)$ $Rbf(B)=R(B)$

. . .

$Rbf(Z)=R(Z)$

[Memory of the Final Value of the Average Consumption Power CPave]

$CPavebf=CPave$

Thereafter, the process goes to Step 6206, wherein correction coefficients K new and K old to the present and past data are calculated according to the above equations (4) and (5) by using the present total sample number NFC total and the predetermined number NFC Imt. Since the process of Step 6206 is executed even in a case where "No" determination is made at Step 6203, correction coefficients K new and K old to the present and past data are calculated in a predetermined calculation cycle (for example, 8 ms cycle) during engine operating.

On the other hand, at Step 6202 described above, when it is determined that the request for initialization is made, the process goes to Step 6204b, wherein the counter of the total sample number NFC total is reset to return the total sample number NFC total to an initial value "1". Then, at Step 6205b, data of the electric consumption average value CFCave (A) to CFCave (Z), the possible power generation amount average value GPave (A) to GPave (Z), the use-frequency R (A) to R (Z) of each class calculated by executing the previous routine and the average consumption power CPave calculated at the calculating routine for the average consumption power in FIG. 6 to be described later are stored in the memory of the control device 11 as the final value CFCavebf (A) to CFCavebf (Z), GPavebf (A) to GPavebf (Z), R bf (A) to R bf (Z) and CPavebf of each data of the previous sample period. Thereafter, the process goes to Step 6206, wherein correction coefficients K new and K old to the present and past data are calculated by using the present total sample number NFC total and the predetermined number NFC lmt according to the equations (4) and (5).

Thereafter, the process goes to Step 3207a in FIG. 13.

A calculating routine for an average consumption power is executed based upon a flow chart in FIG. 14. A calculating routine for a target electric consumption is executed based upon a flow chart in FIG. 6. A calculating routine for a correction amount of a target electric consumption is executed based upon a flow chart in FIG. 8. A determining routine for a power generation execution is executed based upon a flow chart in FIG. 9.

[Estimating Routine for Change of Operating Condition]

Figure 41:
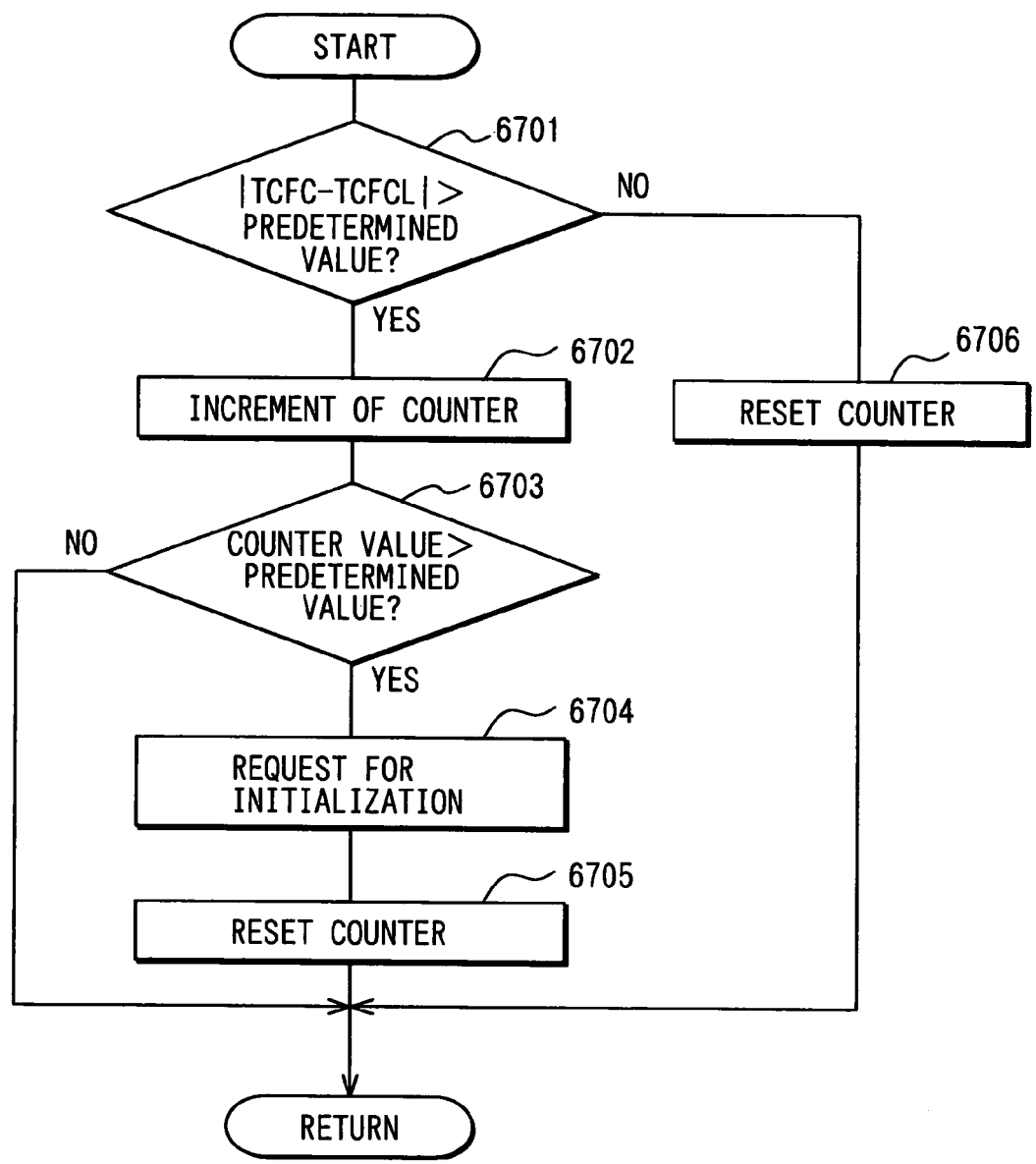
FIG. 41 is a flow chart showing a flow of the process in the estimating routine for a change of an operating condition in a tenth embodiment of the present invention.

An estimating routine for a change of an operating condition in FIG. 41 is executed in a predetermined cycle (for example, 8 ms cycle) during engine operating. When this routine is activated, first at Step 6701, a target electric consumption (first target electric consumption) TCFC calculated based upon data of a normal sample period (first sample period) by the calculating routine for the target electric consumption in FIG. 6 is compared with a target electric consumption (second target electric consumption) TCFCL calculated based upon data of a sample period (second sample period) shorter than the normal sample period by the routine similar to the calculating routine for the target electric consumption in FIG. 6 to determine whether or not an absolute value |TCFC−TCFCL| of a deviation between the two target electric consumptions is larger than a predetermined value.

As a result, when it is determined that the absolute value |TCFC−TCFCL| of the deviation between the two target electric consumptions is larger than the predetermined value, the process goes to Step 6702, wherein a change estimating counter is incremented and the process goes to Step 6703. Then it is determined whether or not a counter value of the change estimating counter exceeds a predetermined value. When it is determined that the counter value of the change estimating counter is less than the predetermined value, this routine ends. In addition, at Step 6701, the absolute value |TCFC−TCFCL| of the deviation between the two target electric consumptions is less than the predetermined value, the process goes to Step 6706, wherein the change estimating counter is reset to end this routine.

Thereby, it is estimated at the following point that there is the change of the future operating condition. That is the point when the continuing time of the state where the absolute value |TCFC−TCFCL| of the deviation between the two target electric consumptions is larger than the predetermined value is counted by the change estimating counter and the count value of the change estimating counter exceeds the predetermined value (the point when the continuing time of the state where the absolute value |TCFC−TCFCL| of the deviation between the two target electric consumptions is larger than the predetermined value). The process goes to Step 6704, wherein a request for initialization (request for correction of the target electric consumption TCFC) is outputted. The process goes to Step 6705, wherein the change estimating counter is reset to end this routine.

Figure 40:
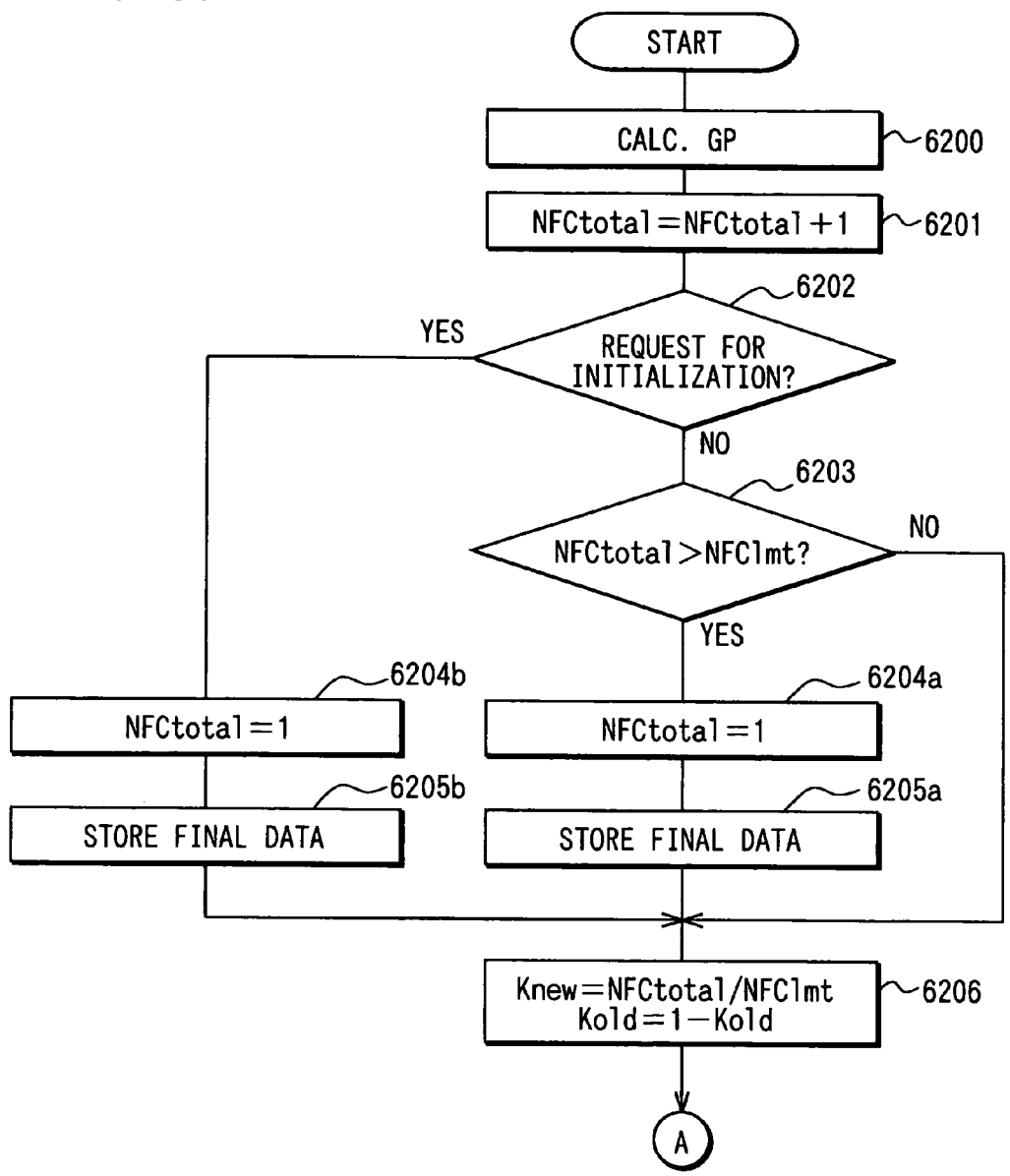
FIG. 40 is a flow chart showing a flow of the process of the former half in the accumulating routine for electric consumption class data in the ninth embodiment.

When this routine outputs a request for initialization (request for correction of the target electric consumption TCFC), it is determined that the request for initialization is made at Step 6202 of the accumulating routine for the electric consumption class data in FIG. 40. Then, each data in the sample period is initialized to realize correction of the target electric consumption TCFC in accordance with a change of the future operating condition by this initialization.

In the tenth embodiment as described above, the target electric consumption is set based upon the use-frequency of the electric consumption, the possible power generation amount and the average consumption power, and the power generation of the alternator 16 is controlled by comparing the electric consumption with the target electric consumption. Therefore, as compared to the conventional power generation control system in which an operating condition for performing power generation is determined by a prescribed map, the power generation control is less affected by accuracy of the map, use environments of a vehicle (a difference in travel road condition, a difference in vehicle speed and a difference in acceleration/deceleration by a driver or the like) or variations in vehicle characteristic. Therefore, the required power generation amount is secured, while certainly reducing an increment of the fuel consumption, leading to an improvement in both fuel economy and charge/discharge balance.

Further, since the tenth embodiment estimates the change of the future operating condition to correct the target electric consumption, the target increment of the fuel consumption can be changed in accordance with the future change of the operating condition in such a way as to quickly balance the future charging amount with the future discharging amount of the battery 12. Therefore, even under the condition where the consumption power relatively largely changes, the change of the consumption power is followed up in good response, enabling an improvement on both charging/discharging balance and fuel consumption reduction.

When the tenth embodiment estimates the change of the future operating condition, the data in the sample period is initialized to correct the target electric consumption. However, a length in the sample period (sample number) may be changed in accordance with the estimated change of the future operating condition to correct the target electric consumption. In this case, it has the same effects as in the tenth embodiment.

In the tenth embodiment, the target electric consumption is set based upon the use-frequency of the electric consumption, the possible power generation amount and the average consumption power. However, the target electric consumption may be set based only upon the use-frequency of the electric consumption, or based upon the possible power generation amount and the average consumption power.

Eleventh Embodiment

In the tenth embodiment, two target electric consumptions are calculated based upon data of two kinds of sample periods, each having a different length. Presence/absence of the change of the future operating condition is estimated depending on whether or not the state where the absolute value of the deviation between the two target electric consumptions is more than a predetermined value lasts for more than a predetermined time. However, when the present invention is applied to a vehicle with a navigation system, a change of the future operating condition may be estimated based upon information obtained from the navigation system.

The eleventh embodiment will be hereinafter explained with reference to FIGS. 42 and 43.

[Estimating Routine for Change of Operating Condition]

Figure 42:
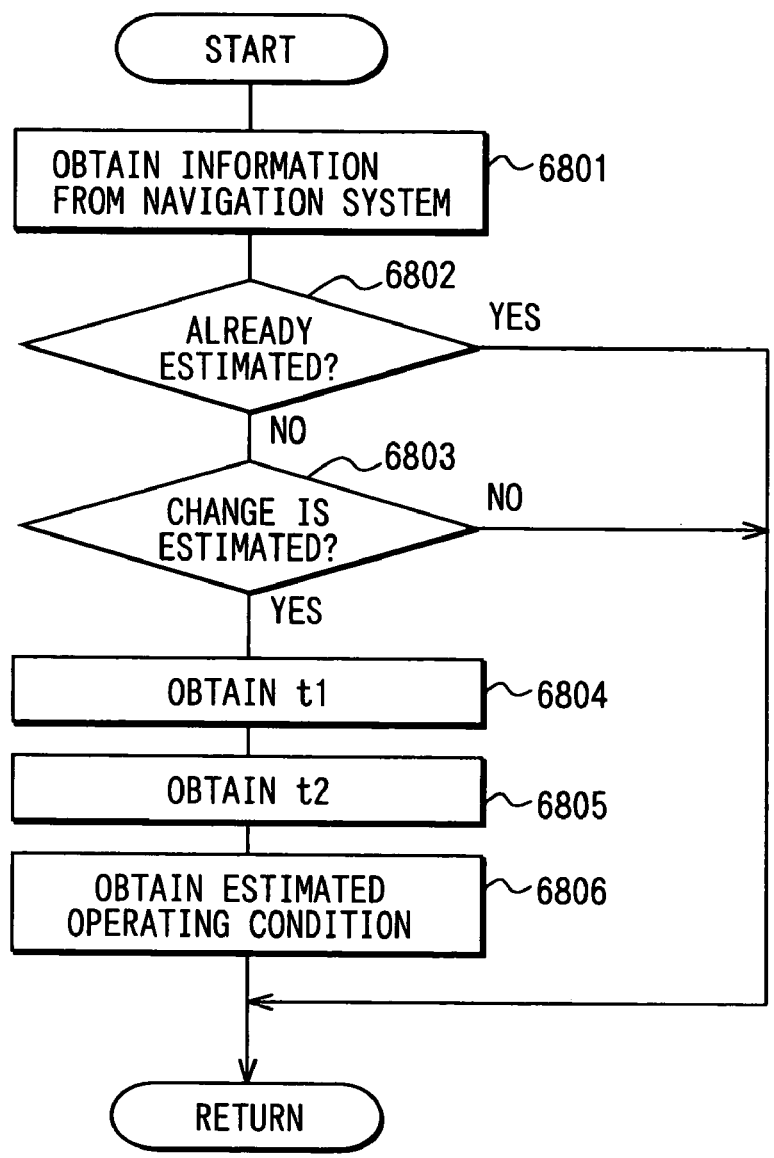
FIG. 42 is a flow chart showing a flow of the process in the estimating routine for a change of an operating condition in an eleventh embodiment of the present invention.

An estimating routine for a change of an operating condition in FIG. 42 is executed in a predetermined cycle (for example, 8 ms cycle) during engine operating, which serves as estimating means for a change of an operating condition. When this routine is activated, first at Step 6801, information outputted from the navigation system is obtained and then, the process goes to Step 6802, wherein it is determined whether or not presence of the change of the future operating condition is already estimated. When it is already estimated, this routine ends.

In addition, when the change of the future operating condition is not estimated yet, the process goes to Step 6803, wherein it is determined based upon the information of the navigation system whether or not the change of the future operating condition is estimated. In this case, changes such as an uphill road/a downhill road/a flat road, a highway road/an open road, a main road/a local road, and a jam-up road/no jam-up road may be estimated from information of the navigation system. When the change of the future operating condition is not estimated at Step 6803, this routine ends Thereafter, at a point when the change of the future operating condition is estimated based upon the information of the navigation system, the process goes to Step 6804, wherein an estimating time t1 when the operating condition changes is obtained from the information of the navigation system. Further, at Step 6805, wherein an estimating time t2 (estimating time when a vehicle reaches a destination) when a vehicle driving ends is obtained from the information of the navigation system. Then at Step 6806, wherein the information of the operating condition which is estimated to be changed in the future is obtained from the information of the navigation system, and this routine ends.

[Calculating Routine for Final Target Electric Consumption]

Figure 43:
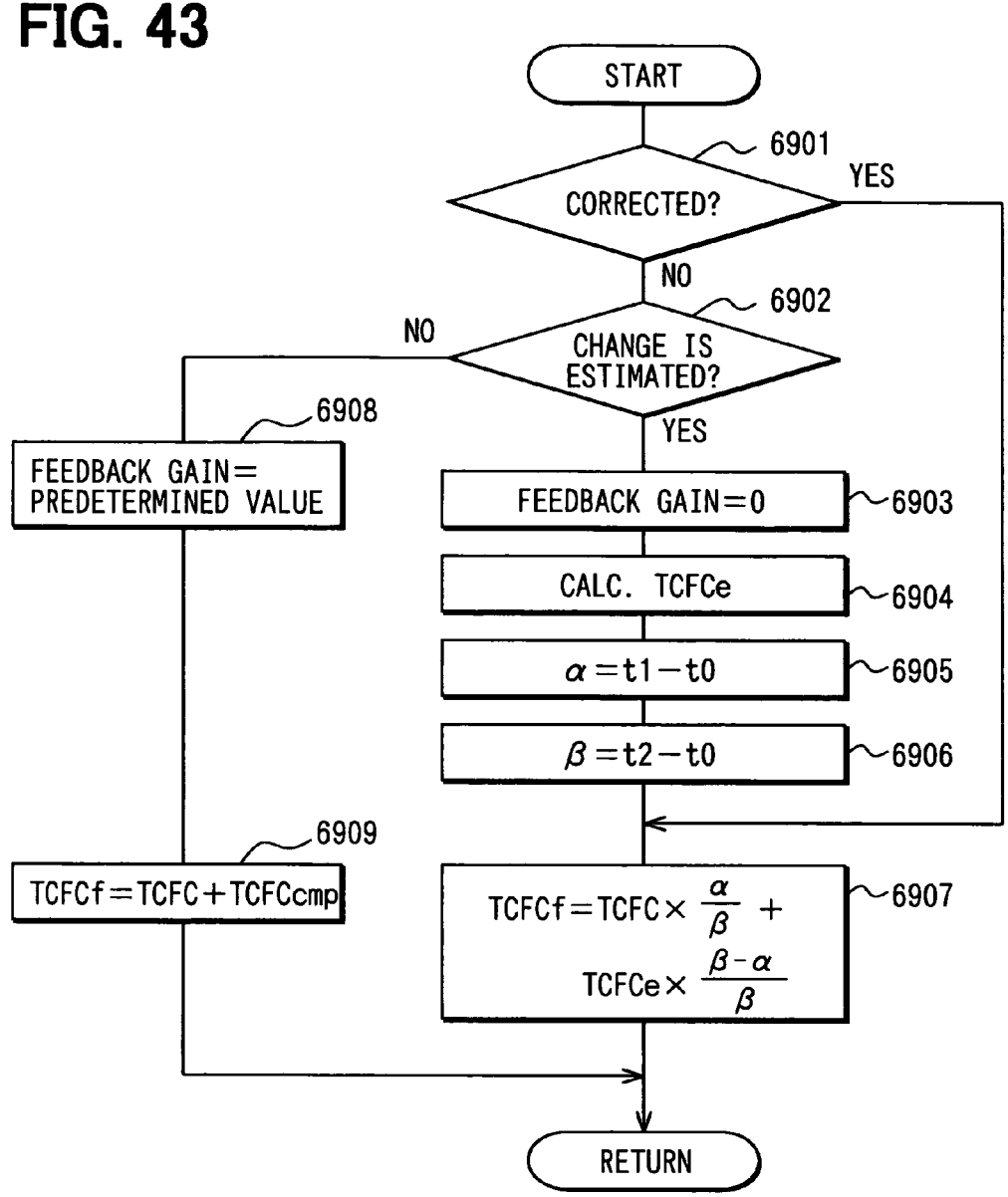
FIG. 43 is a flow chart showing a flow of the process in the calculating routine for final target electric consumption in the eleventh embodiment.

A calculating routine for a final target electric consumption in FIG. 43 is executed in a predetermined cycle (for example, 8 ms cycle) during engine operating, which serves as target value correcting means. When this routine is activated, first at Step 6901, it is determined whether or not a target electric consumption is already corrected based upon estimating a change of the future operating condition (whether or not the processes of Steps 6903 to 6906 are already executed). When it is estimated that the target electric consumption is already corrected, the process goes to Step 6907, which will be described later.

On the other hand, at Step 6901, when it is determined that the target electric consumption is not corrected yet, the process goes to Step 6902, wherein it is determined whether or not a change of the future operating condition is estimated, based upon the information of the navigation system. When the change of the future operating condition is not estimated, the process goes to Step 6908, wherein a feedback gain (KI and KP used at the calculating routine for the correction amount of the target electric consumption in FIG. 8) for performing feedback correction on the target electric consumption TCFC in such a way as to reduce a deviation between the present SOC and the target SOC of the battery 12 is set to a predetermined value. Then, the process goes to Step 6909, wherein the target electric consumption TCFC calculated at the calculating routine for the target electric consumption in FIG. 6 is corrected with the feedback correction amount TCFCcmp calculated by the calculating routine for the correction amount of the target electric consumption in FIG. 8 to determine a final target electric consumption TCFCf.

$$TCFCf = TCFC + TCFCcmp$$

On the other hand, when the change of the future operating condition is estimated based upon the information of the navigation system at Step 6902, the process goes to Step 6903, wherein the feedback gain (KI and KP used at the calculating routine for the correction amount of the target electric consumption in FIG. 8) is set as zero to prohibit the feedback correction on the target electric consumption TCFC based upon the deviation between the present SOC and the target SOC of the battery 12.

Thereafter, the process goes to Step 6904, wherein target electric consumption TCFCe is calculated in the future operating condition as estimated to be changed and then, the process goes to Step 6905, wherein time α from time t0 when a change of the future operating condition is first estimated to time t1 when the operating condition changes is calculated.

$$\alpha = t1 - t0$$

In addition, at Step 6906, time β from time t0 when a change of the future operating condition is first estimated to time t2 when the operating ends.

$$\beta = t2 - t0$$

Thereafter, the process goes to Step 6907, wherein the target electric consumption TCFC e in the future operating condition calculated at Step 6904 is used to correct the target electric consumption TCFC calculated by the calculating routine for the target electric consumption in FIG. 7 according to the following equation for determining a final target electric consumption TCFCf.

$$TCFCf = TCFC \times \alpha/\beta + TCFC\ ex(\beta-\alpha)/\beta$$

In the eleventh embodiment, when the present electric consumption CFC is compared with the final target electric consumption TCFCf. When the present electric consumption CFC is larger than the final target electric consumption TCFCf, a power generation command value is set as zero to stop power generation of the alternator 16. On the other hand, when the present electric consumption CFC is smaller than the final target electric consumption TCFCf, the power generation command value is set as a required power generation amount to converge the SOC of the battery 12 on the target SOC.

Since the eleventh embodiment as described above estimates the change of the future operating condition to correct the target electric consumption, the target increment of the fuel consumption can be changed in accordance with the change of the future operating condition in such a way as to quickly balance the future charging amount with the future discharging amount of the battery 12. Therefore, even under the condition where the operating condition relatively largely changes, the change of the operating condition is followed up in good response, enabling an improvement on both charging/discharging balance and fuel consumption reduction.

Further, the eleventh embodiment prohibits feedback correction on the target electric consumption based upon the deviation between the present SOC and the target SOC of the battery 12 when the change of the future operating condition is estimated to correct the target electric consumption. Therefore, it is prevented that the correction amount of the target electric consumption based upon the estimation of the change of the future operating condition is cancelled by the feedback correction. Accordingly, correction on the target increment of the fuel consumption based upon estimating the change of the future operating condition can be accurately made without influence of the feedback correction.

However, the eleventh embodiment may limit only the feedback correction in such a way as to reduce influence of the feedback correction for correcting the target electric consumption based upon estimating the change of the future operating condition.

In addition, in the eleventh embodiment, time β from time t0 when the change of the future operating condition is first estimated to time t2 when the operating ends is used, but instead, time from time t0 when the change of the future operating condition is first estimated to time when the operating condition returns back to the present state may be used.

While only the selected preferred embodiments have been chosen to illustrate the present invention, it will be apparent to those skilled in the art from this disclosure that various changes and modifications can be made therein without departing from the scope of the invention as defined in the appended claims. Furthermore, the foregoing description of the preferred embodiments according to the present invention is provided for illustration only, and not for the purpose of limiting the invention as defined by the appended claims and their equivalents.

What is claimed is:

1. A power generation control device for an internal combustion engine equipped with an alternator driven by the internal combustion engine, a battery charged with power generated by the alternator, and a power generation controller for controlling power generation of the alternator, the power generation control device comprising:
   a fuel consumption calculator for calculating an increment of a fuel consumption per unit power generation amount based upon an increment of the fuel consumption and a power generation amount by the power generation of the alternator, wherein:
   the power generation controller controls the increment of the fuel consumption per unit power generation amount to a target increment of the fuel consumption.

2. The power generation control device for the internal combustion engine according to claim 1, wherein:
   the power generation controller determines whether or not to execute the power generation of the alternator by comparing the increment of the fuel consumption per unit power generation amount in the present operating condition with the target increment of the fuel consumption.

3. The power generation control device for the internal combustion engine according to claim 1, wherein:
   the power generation controller sets the target increment of the fuel consumption so that a balance between charge and discharge of the battery becomes zero.

4. The power generation control device for the internal combustion engine according to claim 1, wherein:
   the power generation controller sets the target increment of the fuel consumption based upon a use-frequency of the increment of the fuel consumption per unit power generation amount in the past travel history.

5. The power generation control device for the internal combustion engine according to claim 1, wherein:
   the power generation controller sets the target increment of the fuel consumption based upon use-frequency of the increment of the fuel consumption per unit power generation amount and a possible power generation amount in the past travel history.

6. The power generation control device for the internal combustion engine according to claim 1, wherein:
   the power generation controller sets the target increment of the fuel consumption based upon use-frequency of the increment of the fuel consumption per unit power generation amount, a possible power generation amount and average consumption power in the past travel history.

7. A power generation control device for an internal combustion engine which is equipped with an alternator driven by the internal combustion engine and a battery charged with power generated by the alternator comprising:
   a battery detector for detecting a charging state of the battery;
   a fuel consumption calculator for calculating an increment of a fuel consumption per unit power generation amount based upon an increment of the fuel consumption and a power generation amount by the power generation of the alternator;
   a power generation controller for controlling the power generation of the alternator by comparing the increment of the fuel consumption per unit power generation amount with a target increment of the fuel consumption; and
   target value correcting means to correct the target increment of the fuel consumption based upon the charging state of the battery detected by the battery detector.

8. The power generation control device for the internal combustion engine according to claim 7, wherein:
   the power generation controller sets the target increment of the fuel consumption in such a way as to balance charge of the battery with discharge thereof.

9. The power generation control device for the internal combustion engine according to claim 7, wherein:
   the power generation controller sets the target increment of the fuel consumption based upon a use-frequency for each class of the increment of the fuel consumption per unit power generation amount in the past travel history.

10. The power generation control device for the internal combustion engine according to claim 7, wherein:
    the power generation controller sets the target increment of the fuel consumption based upon a use-frequency for each class of the increment of the fuel consumption per unit power generation amount and a possible power generation amount in the past travel history.

11. The power generation control device for the internal combustion engine according to claim 7, wherein:
    the power generation controller sets the target increment of the fuel consumption based upon a use-frequency for each class of the increment of the fuel consumption per unit power generation amount, a possible power generation amount and average consumption power in the past travel history.

12. The power generation control device for the internal combustion engine according to claim 7, wherein:
    the battery detector calculates a charging rate of the battery; and
    the target value correcting means corrects the target increment of the fuel consumption based upon the charging rate of the battery.

13. The power generation control device for the internal combustion engine according to claim 12, wherein:
    the target value correcting means performs feedback correction on the target increment of the fuel consumption in such a way as to reduce a deviation between the charging rate and a target charging rate of the battery.

14. The power generation control device for the internal combustion engine according to claim 8, wherein:
the target value correcting means calculates a charging and discharging amount required for making the charging rate of the battery be equal to the target charging rate thereof and corrects a reference point of the balance between the charge and the discharge of the battery based upon the calculated charging and discharging amount for correcting the target increment of the fuel consumption.

15. A power generation control device for an internal combustion engine, comprising:
a alternator driven by the internal combustion engine;
a battery charged with power generated by the alternator;
a fuel consumption calculator for calculating an increment of a fuel consumption per unit power generation amount based upon an increment of the fuel consumption and a power generation amount by power generation of the alternator in a predetermined calculation cycle during operating of the internal combustion engine;
a target value calculator for calculating a use-frequency of the increment of the fuel consumption per unit power generation based upon data of the increment of the fuel consumption per unit power generation in the past travel history and a sample number thereof to calculate a target increment of the fuel consumption based upon the use-frequency; and
a power generation controller for controlling the power generation of the alternator by comparing the present increment of the fuel consumption per unit power generation amount calculated by the fuel consumption calculator with the target increment of the fuel consumption, wherein:
the target value calculator changes the sample number of the data used for calculating the target increment of the fuel consumption to calculate the use-frequency of the increment of the fuel consumption per unit power generation amount in a new sample period in a predetermined calculation cycle.

16. The power generation control device for the internal combustion engine according to claim 15, wherein:
the target value calculator initializes the sample number each time the sample number of the data used for calculating the target increment of the fuel consumption comes to a predetermined number to calculate the use-frequency of the increment of the fuel consumption per unit power generation amount in a new sample period in a predetermined calculation cycle.

17. The power generation control device for the internal combustion engine according to claim 16, further comprising:
memory means which stores a final value of the data each time the sample number of the data comes to the predetermined number, wherein:
the target value calculator uses the final value of a previous sample period stored in the memory means to correct the data of a present sample period in accordance with the sample number of the present sample period started after the final value of the data is stored and calculates the target increment of the fuel consumption based upon the corrected data.

18. The power generation control device for the internal combustion engine according to claim 15, wherein:
the target value calculator sets the target increment of the fuel consumption based upon the use-frequency of the increment of the fuel consumption per unit power generation amount, a possible power generation amount and an average consumption power.

19. The power generation control device for the internal combustion engine according to claim 15, further comprising:
target value correcting means which corrects the target increment of the fuel consumption based upon a charging/discharging state of the battery.

20. The power generation control device for the internal combustion engine according to claim 15, wherein:
the target value calculator sets the target increment of the fuel consumption in such a way as to keep a balance between charge and discharge of the battery.

21. The power generation control device for the internal combustion engine according to claim 15, wherein:
the target value calculator sets the sample number of the data used for calculating the target increment of the fuel consumption, in accordance with a charging/discharging state of the battery.

22. The power generation control device for the internal combustion engine according to claim 15, wherein:
the target value calculator sets the sample number of the data used for calculating the target increment of the fuel consumption, in accordance with a capacity of the battery.

23. The power generation control device for the internal combustion engine according to claim 15, wherein:
the target value calculator sets the sample number of the data used for calculating the target increment of the fuel consumption, in accordance with an average consumption power.

24. The power generation control device for the internal combustion engine according to claim 19, wherein:
the target value correcting means sets a correction gain for correcting the target increment of the fuel consumption based upon the charging/discharging state of the battery, in accordance with the charging/discharging state of the battery.

25. The power generation control device for the internal combustion engine according to claim 19, wherein:
the target value correcting means sets a correction gain for correcting the target increment of the fuel consumption based upon the charging/discharging state of the battery, in accordance with a capacity of the battery.

26. The power generation control device for the internal combustion engine according to claim 19, wherein:
the target value correcting means sets a correction gain for correcting the target increment of the fuel consumption based upon the charging/discharging state of the battery, in accordance with an average consumption power.

27. A power generation control device for an internal combustion engine comprising:
a alternator driven by the internal combustion engine;
a battery charged with power generated by the alternator;
a fuel consumption calculator for calculating an increment of a fuel consumption per unit power generation amount based upon an increment of the fuel consumption and a power generation amount by the power generation of the alternator;
a consumption power information calculator for calculating information of consumption power in a predetermined calculation cycle during operating of the internal combustion engine;
a target value calculator for calculating a target increment of the fuel consumption based upon a use-frequency of the increment of the fuel consumption per unit power generation in the past travel history and the information of the consumption power; and a power generation controller for controlling the power generation of the alternator by comparing the present increment of the fuel consumption per unit power generation amount calculated by the fuel consumption calculator with the target increment of the fuel consumption, the power generation control device further comprising:

future consumption power estimating means which estimates future consumption power, wherein:

the target value calculator uses the future consumption power estimated by the future consumption power estimating means and the consumption power in the past travel history as the information of the consumption power to calculate the target increment of the fuel consumption.

28. The power generation control device for the internal combustion engine according to claim 27, wherein:

the consumption power information calculator calculates an average consumption power in the past travel history;

the future consumption power estimating means estimates a changing amount of the future consumption power based upon a deviation between the average consumption power in the past travel history and the present consumption power and estimates a converging value of future average consumption power based upon the average consumption power in the past travel history and the estimated changing amount of the future consumption power; and the target value calculator uses the estimated converging value of the future average consumption power estimated by the future consumption power estimating means as the information of the consumption power to calculate the target increment of the fuel consumption.

29. The power generation control device for the internal combustion engine according to claim 27, wherein:

the consumption power information calculator calculates an average consumption power in the past travel history;

the future consumption power estimating means estimates a change of a use state of the future electric load to estimate the changing amount of the future consumption power caused by the change of the use state of the future electric load and estimates a converging value of future average consumption power based upon the average consumption power in the past travel history and the estimated changing amount of the future consumption power; and the target value calculator uses the estimated converging value of the future average consumption power estimated by the future consumption power estimating means as the information of the consumption power to calculate the target increment of the fuel consumption.

30. The power generation control device for the internal combustion engine according to claim 28, wherein:

the future consumption power estimating means gradually reduces the estimated changing amount of the future consumption power.

31. The power generation control device for the internal combustion engine according to claim 27, wherein:

the target value calculator includes means which corrects the estimated changing amount of the future consumption power for a period from a time when the future consumption power is estimated to a time when an actual consumption power changes.

32. The power generation control device for the internal combustion engine according to claim 31, wherein:

the target value calculator includes means which corrects the estimated changing amount of the future consumption power based upon a deviation between the actual consumption power and the future consumption power and a time period from the time when the future consumption power is estimated to the time when the actual consumption power changes.

33. A power generation control device for an internal combustion engine comprising:

a alternator driven by the internal combustion engine;

a battery charged with power generated by the alternator;

a fuel consumption calculator for calculating an increment of a fuel consumption per unit power generation amount based upon an increment of the fuel consumption and a power generation amount by the power generation of the alternator in a predetermined calculation cycle during operating of the internal combustion engine;

a consumption power information calculator for calculating information of consumption power in a predetermined calculation cycle during operating of the internal combustion engine;

a target value calculator for calculating a target increment of the fuel consumption based upon a use-frequency of the increment of the fuel consumption per unit power generation and the information of the consumption power in the past travel history; and a power generation controller for controlling the power generation of the alternator by comparing the present increment of the fuel consumption per unit power generation amount calculated by the fuel consumption calculator with the target increment of the fuel consumption, the power generation control device further comprising:

future consumption power estimating means which estimates future consumption power, wherein:

the target value calculator includes means which corrects the target increment of the fuel consumption based upon the future consumption power estimated by the future consumption power estimating means and the consumption power in the past travel history.

34. A power generation control device for an internal combustion engine comprising:

a alternator driven by power of the internal combustion engine;

a battery charged with power generated by the alternator;

a fuel consumption calculator for calculating an increment of a fuel consumption per unit power generation amount based upon the increment of the fuel consumption and a power generation amount by the power generation of the alternator in a predetermined calculation cycle during operating of the internal combustion engine;

a target value calculator for statistically processing data of the increment of the fuel consumption per unit power generation calculated in the predetermined calculation cycle to calculate a use-frequency of the increment of the fuel consumption per unit power generation for calculating a target increment of the fuel consumption based upon the use-frequency;

a power generation controller for controlling the power generation of the alternator by comparing the present increment of the fuel consumption per unit power generation amount calculated by the fuel consumption calculator with the target increment of the fuel consumption, the power generation control device further comprising:

memory means which stores and holds the target increment of the fuel consumption at a time of a previous traveling, wherein:

the target value calculator determines a final target increment of the fuel consumption based upon the target increment of the fuel consumption calculated at the time of a present traveling and the target increment of the fuel consumption at the time of the previous traveling stored in the memory means until a sample period of data of the increment of the fuel consumption per unit power generation amount at the time of the present traveling exceeds a predetermined period.

35. The power generation control device for the internal combustion engine according to claim 34, wherein:

the target value calculator determines the final target increment of the fuel consumption by a weighted average between the target increment of the fuel consumption calculated at the time of the present traveling and the target increment of the fuel consumption at the time of the previous traveling stored in the memory means.

36. The power generation control device for the internal combustion engine according to claim 35, wherein:

the target value calculator sets a weighting factor used for processing the weighted average based upon the sample period of the data at the time of the present traveling.

37. The power generation control device for the internal combustion engine according to claim 35, wherein:

the target value calculator sets the weighting factor used for processing the weighted average based upon a deviation between the target increment of the fuel consumption calculated at the time of the present traveling and the target increment of the fuel consumption at the time of the previous traveling stored in the memory means.

38. The power generation control device for the internal combustion engine according to claim 35, wherein:

the target value calculator sets the weighting factor used for processing the weighted average based upon one or a combination of at least two of consumption power, an operating condition, a remaining charging amount of the battery and a battery capacity at the time of the present traveling.

39. A power generation control device for an internal combustion engine comprising:

a alternator driven by the internal combustion engine;
a battery charged with power generated by the alternator;
a fuel consumption calculator for calculating an increment of a fuel consumption per unit power generation amount based upon an increment of the fuel consumption and a power generation amount by the power generation of the alternator in a predetermined calculation cycle during operating of the internal combustion engine;
a target value calculator for statistically processing data of the increment of the fuel consumption per unit power generation calculated during the operating of the internal combustion engine to calculate a use-frequency of the increment of the fuel consumption per unit power generation for calculating a target increment of the fuel consumption based upon the use-frequency; and
a power generation controller for controlling the power generation of the alternator by comparing the present increment of the fuel consumption per unit power generation amount calculated by the fuel consumption calculator with the target increment of the fuel consumption, the power generation control device further comprising:

memory means which stores and holds the target increment of the fuel consumption at the time of the previous traveling, wherein:

the target value calculator uses the target increment of the fuel consumption at the time of the previous traveling stored in the memory means as the target increment of the fuel consumption at the time of the present traveling until a sample period of data of the increment of the fuel consumption per unit power generation amount at the time of the present traveling exceeds a predetermined period.

40. The power generation control device for the internal combustion engine according to claim 39, wherein:

the target value calculator sets the predetermined period based upon at least one of consumption power, an operating condition, a remaining charging amount of the battery and a battery capacity at the time of the present traveling.

41. A power generation control device for an internal combustion engine comprising:

a alternator driven by the internal combustion engine;
a battery charged with power generated by the alternator;
a fuel consumption calculator for calculating an increment of a fuel consumption per unit power generation amount based upon an increment of the fuel consumption and a power generation amount by the power generation of the alternator in a predetermined calculation cycle during operating of the internal combustion engine;
a target value calculator for statistically processing data of the increment of the fuel consumption per unit power generation calculated in the predetermined calculation cycle to calculate a use-frequency of the increment of the fuel consumption per unit power generation for calculating a target increment of the fuel consumption based upon the use-frequency; and
a power generation controller for controlling the power generation of the alternator by comparing the present increment of the fuel consumption per unit power generation amount calculated by the fuel consumption calculator with the target increment of the fuel consumption, the power generation control device further comprising:

condition estimating means which estimates a change of a future operating condition; and
target value correcting means which corrects the target increment of the fuel consumption when the change of the future operating condition is estimated by the condition estimating means.

42. The power generation control device for the internal combustion engine according to claim 41, wherein:

the target value correcting means initializes data used for calculating a use-frequency of the increment of the fuel consumption per unit power generation when the change of the future operating condition is estimated by the condition estimating means to correct the target increment of the fuel consumption.

43. The power generation control device for the internal combustion engine according to claim 41, wherein:

the target value correcting means changes a length of a sample period of data used for calculating a use-frequency of the increment of the fuel consumption per unit power generation in accordance with the change of the future operating condition estimated by the condition estimating means to correct the target increment of the fuel consumption.

44. The power generation control device for the internal combustion engine according to claim 41, wherein:
the target value calculator executes a process for calculating a first target increment of the fuel consumption based upon data of a first sample period and a process for calculating a second target increment of the fuel consumption based upon data of a second sample period shorter than the first sample period, in parallel therewith; and
the condition estimating means estimates the change of the future operating condition based upon a deviation between the first and second target increments of the fuel consumption.

45. The power generation control device for the internal combustion engine according to claim 41, wherein:
the condition estimating means estimates the change of the future operating condition based upon information obtained from a navigation system.

46. The power generation control device for the internal combustion engine according to claim 41, wherein:
the target value correcting means corrects the target increment of the fuel consumption during a time period from a time when the change of the future operating condition is estimated to a time when the operating condition actually changes or the operating ends.

47. The power generation control device for the internal combustion engine according to claim 41, wherein:
the target value correcting means corrects the target increment of the fuel consumption based upon a time period from a time when the change of the future operating condition is estimated to a time when the operating condition actually changes, a time period from the time when the change of the future operating condition is estimated to a time when the operating ends, and a converging value of the target increment of the fuel consumption in the estimated future operating condition.

48. The power generation control device for the internal combustion engine according to claim 41, wherein:
the target value correcting means includes:
means which performs feedback correction on the target increment of the fuel consumption in such a way as to make a remaining charging amount of the battery be closer to a target remaining charging amount; and
means which prohibits or limits the feedback correction for a period of correcting the target increment of the fuel consumption based upon an estimation of the change of the future operating condition.

* * * * *